US011167321B2

(12) United States Patent
 Jones

(10) Patent No.: US 11,167,321 B2
(45) Date of Patent: Nov. 9, 2021

(54) PHOTOVOLTAIC SOIL MONITORING SYSTEM WITH AUTOMATED CLEAN REFERENCING SYSTEM

(71) Applicant: Ryan Bower Jones, Carlsbad, TN (US)

(72) Inventor: Ryan Bower Jones, Carlsbad, TN (US)

( * ) Notice: Subject to any disclaimer, the term of this patent is extended or adjusted under 35 U.S.C. 154(b) by 51 days.

(21) Appl. No.: 16/364,528

(22) Filed: Mar. 26, 2019

(65) Prior Publication Data

US 2020/0091865 A1    Mar. 19, 2020

Related U.S. Application Data

(63) Continuation of application No. 15/905,870, filed on Feb. 27, 2018, now Pat. No. 10,243,514, which is a continuation-in-part of application No. 15/173,821, filed on Jun. 6, 2016, now Pat. No. 9,906,190.

(60) Provisional application No. 62/571,461, filed on Oct. 12, 2017, provisional application No. 62/590,267, filed on Nov. 22, 2017, provisional application No. 62/263,267, filed on Dec. 4, 2015, provisional application No. 62/254,401, filed on Nov. 12, 2015, provisional application No. 62/216,257, filed on Sep. 9, 2015, provisional application No. 62/171,187, filed on Jun. 4, 2015.

(51) Int. Cl.
| | |
|---|---|
| *G01R 31/26* | (2020.01) |
| *G01N 21/94* | (2006.01) |
| *H02S 50/00* | (2014.01) |
| *B08B 1/00* | (2006.01) |
| *H02S 50/10* | (2014.01) |
| *H02S 40/10* | (2014.01) |
| *B08B 13/00* | (2006.01) |

(52) U.S. Cl.
CPC ............. *B08B 1/002* (2013.01); *B08B 1/008* (2013.01); *B08B 13/00* (2013.01); *H02S 40/10* (2014.12); *H02S 50/00* (2013.01); *H02S 50/10* (2014.12)

(58) Field of Classification Search
CPC ...... G01R 31/025; G01R 31/08; G01R 31/26; G01R 31/40; G05F 1/67; H02S 40/00; H02S 40/10; H02S 40/32; H02S 40/36; H02S 50/00; H02S 50/10; H02J 3/16; H02J 3/283; H02J 3/285; H02J 3/286
See application file for complete search history.

(56) References Cited

U.S. PATENT DOCUMENTS

| | | |
|---|---|---|
| 8,725,437 B2 | 5/2014 | Caine |
| 8,952,715 B2 | 2/2015 | Gillispe et al. |
| 9,154,075 B2 | 10/2015 | Chen |

(Continued)

FOREIGN PATENT DOCUMENTS

| | | |
|---|---|---|
| WO | 2010135321 | 2/2011 |
| WO | 2014081967 | 5/2014 |

*Primary Examiner* — Minh N Tang
(74) *Attorney, Agent, or Firm* — Matthew M. Googe; Robinson IP Law, PLLC

(57) ABSTRACT

A solar panel cleaning system includes: an automated cleaning device for cleaning a surface of a reference cell panel; a cleaning device controller in communication with a motor of the automated cleaning device, the cleaning device controller configured to receive a signal corresponding to measurement of a current of photovoltaic system. The cleaning device controller activates the automated cleaning device to clean a surface of the reference cell panel when the received signal indicates that a measurement of the current of the photovoltaic system is to be taken.

13 Claims, 9 Drawing Sheets

(56) References Cited

U.S. PATENT DOCUMENTS

| | | | |
|---|---|---|---|
| 9,564,853 B2 * | 2/2017 | Gostein | G01N 21/94 |
| 2009/0266353 A1 * | 10/2009 | Lee | H02S 40/10 126/593 |
| 2010/0212093 A1 * | 8/2010 | Pak | F24S 50/00 15/97.1 |
| 2012/0053867 A1 | 3/2012 | Dunn | |
| 2014/0077608 A1 | 3/2014 | Nosaka et al. | |
| 2014/0100698 A1 | 4/2014 | Suresh et al. | |
| 2017/0194897 A1 | 7/2017 | Lopez et al. | |

\* cited by examiner

PHOTOVOLTAIC SOIL MONITORING
SYSTEM WITH AUTOMATED CLEAN
REFERENCING SYSTEM

CROSS-REFERENCES TO RELATED
APPLICATIONS

This application claims priority to and is a continuation of pending U.S. patent application Ser. No. 15/905,870 entitled "Soil Monitoring System" and filed on Feb. 27, 2018, now U.S. Pat. No. 10,243,514, which claims priority to and is a continuation-in-part of U.S. patent application Ser. No. 15/173,821 entitled "Soil Monitoring System" and filed on Jun. 6, 2016, now U.S. Pat. No. 9,906,190, U.S. Provisional Patent Application Ser. No. 62/273,267 entitled "Soil Monitoring Platform for Photovoltaic Panels" and filed on Dec. 30, 2015, U.S. Provisional Patent Application Ser. No. 62/254,401 entitled "Automated System for Cleaning a PV Reference Panel, Single Piece of Glass, or Other Suitable Surface" and filed on Nov. 12, 2015, U.S. Provisional Patent Application Ser. No. 62/216,257 entitled "PV Soil Monitoring Platform" and filed on Sep. 9, 2015, and U.S. Provisional Patent Application Ser. No. 62/171,187 entitled "Solar Panel Soiling Monitoring System" filed on Jun. 4, 2015, the contents of which are hereby incorporated by reference in their entireties. This application also claims priority to U.S. Provisional Patent Application Ser. No. 62/590,267 entitled "PV Soil Monitoring System" and filed on Nov. 22, 2017, U.S. Provisional Patent Application Ser. No. 62/571,461 entitled "PV Soil Monitoring System with Automated Clean Reference Enclosure" and filed on Oct. 12, 2017, the contents of which are hereby incorporated by reference in their entireties.

FIELD

This disclosure relates to the field of photovoltaic panels. More particularly, this disclosure relates to a solar panel soiling monitoring system for monitoring reduced power generated by solar panels as they become contaminated by dust and dirt.

BACKGROUND

Solar panels utilize energy from the sun and convert the sun's energy to electrical power. It is important for solar panels to remain clean to maximize production from the solar panels. Cleaning large-scale photovoltaic (PV) plants or rooftop commercial PV plants can be expensive. Further, it is important to understand the required frequency and timing of cleanings to optimize performance of the PV plant and to minimize costs.

Traditional methods to measure loss of energy due to soiling of the PV system include measuring a combination of voltage and current for a specified PV panel or panels in reference to a clean PV panel. However, due to the fact that standard PV panels consist of a plurality of series-connected PV cells these measurements are limited in accuracy and are lacking in the detailed analysis of the patterns of soiling in a PV system. Alternative methods have been developed to measure soiling levels by measuring the differences in current and voltage on two single cell pv reference panels. However, these methods lack the characteristic effects of soiling that are specific to a PV panel consisting of a plurality of cells mounted inside a standard PV module. The present invention seeks to solve this problem by connecting each cell of a plurality of pv cells to a Measurement Unit (FIGS. 1, 6), whereby the Isc of each cell can be measured individually providing detailed information regarding the effects of soiling at each part of the pv panel.

PV Reference Cells are typically used to establish an irradiance baseline for PV plants. The irradiance measurements provided by PV Reference Cells are used in the calculation of important performance metrics such as Performance Ratio, for PV plants of all types and sizes. A current measurement of the PV cell typically is measured at regular intervals throughout the day and in the same plane of array (POA) as the native PV panels. In this way, the PV Reference Cell provides a performance an irradiance baseline that is used to calculate the performance of the native PV system to determine if the PV system is operating to expectation.

PV reference cells are often calibrated regularly according to rigorous standards to ensure accuracy of the reference cells. The accuracy and reliability of this irradiance baseline is extremely important to the modeling, monitoring and operation of the PV plant, in order to find and diagnose problems and ensure that the PV system is being operated according to and O&M contract, as well as to ensure performance targets are being met.

However, dirt and other debris collect on the surface of the PV reference cells over time and cause discrepancies in the measurements of the PV reference cell. Often the contribution of soiling on the PV panels is overlooked due to the fact that the PV reference cells are themselves not clean and therefore include the soiling loss in the baseline irradiance measurements.

The common method for cleaning PV Reference Cells requires sending a technician to the PV plant to wipe off the cell periodically. This is both costly and impractical for the majority of PV plants, which are often located in remote locations.

Automated methods for remote cleaning of the PV Reference Cell are not readily available and tend to include complex methods that are both unreliable and/or require additional maintenance.

What is needed, therefore, is solar panel soiling monitoring system for monitoring reduced power generated by solar panels as they become contaminated by dust and dirt.

SUMMARY

The above and other needs are met by a solar panel monitoring system for measuring soiling losses in a photovoltaic system. In a first aspect, a solar panel soiling monitoring system for a photo-voltaic (PV) system is provided, the monitoring system including: a soil monitoring panel including a plurality of arranged photovoltaic cells arranged on a rectangular frame and connected in series to one another; a measurement unit including a circuit board in electronic communication with a switchbox for controlling measurements of each of the plurality of photovoltaic cells of the soil monitoring panel, the measurement unit in electronic communication with each of the plurality of photovoltaic cells of the solar monitoring panel; a communication unit in electronic communication with the measurement unit and including a device for transmitting a detected short circuit current of each individual photovoltaic cell of the plurality of photovoltaic cells; and a data storage system in electronic communication with the communication unit including a processor, a computer readable storage medium, and one or more computer programs operable on the data storage system. The data storage system determines soiling conditions of the soil monitoring panel based on measured short circuit currents of each of the plurality of photovoltaic cells of the soil monitoring panels.

In one embodiment, the solar panel monitoring system includes a reference solar panel which may be installed on the same glass substrate as the Solar Monitoring panel and includes at least one photovoltaic cell in electronic communication with the measurement unit and or data acquisition system, wherein the measurement unit receives a short circuit current measurement of the at least one photovoltaic cell of the reference solar panel and wherein the data storage system further determines conditions of the soil monitoring panel based on compared measured short circuit currents of each of the plurality of photovoltaic cells of the soil monitoring panel and the at least one photovoltaic cell of the reference solar panel.

In another embodiment, the reference solar panel is positioned at the same azimuth and elevation angle as the soil monitoring panel and onto the same glass substrate as the Soil Monitoring panel.

In yet another embodiment, the reference solar panel further comprises an automatic Clean Reference system, which includes one or more movable cleaning components and a protective outer cover which covers and seals the PV reference cell(s) from environmental contaminants, when not in use. The Clean Reference System consists of a motor control unit which is in electronic communication with the DAS, wherein the controller activates the motor to open or close the Reference Cell Cover and hermetically seal the pv reference cell from exposure to outside contaminants.

In one embodiment, the solar panel monitoring system further includes one or more environmental condition sensors and PV String sensors, in electronic communication with the data storage system, communications unit, and/or measurement unit, and the one or more environmental condition and or PV string sensors selected from the group consisting of a PV string voltage, PV string current, temperature sensor, rain or moisture sensor, and a wind sensor.

In yet another embodiment, the solar panel monitoring system further includes a communications module, in electronic communication with the data acquisition system for communicating with a remote server database.

In one embodiment, the solar panel monitoring system further includes a communications module, in electronic communication with the remote server.

In one embodiment the solar panel monitoring system includes a charge controller in electronic communication with one or more PV cells of the Soil Monitoring Panel and or PV Reference Cell Panel and which performs the function of charging a local battery with the power from the PV cells, when the PV cells are not being measured.

In yet another embodiment, the solar panel monitoring system includes a forecasting module implemented on the data storage system and or Remote Server, wherein the forecasting module determines a cleaning schedule of a photovoltaic system based on a determined soiling rate of the soil monitoring panel.

In a second aspect, a method of determining a soiling condition of a photo-voltaic system is provided, the method including: (1) providing a soil monitoring panel having a plurality of arranged photovoltaic cells; (2) providing a measurement unit in electronic communication with each of the individual photovoltaic cells of the soil monitoring panel; (3) providing a data acquisition system including a processor, a computer readable storage medium, and one or more computer programs operable on the data acquisition system; (4) providing a communications unit (FIG. 1, 6), for communicating with a server database; (5) measuring a short circuit current of each of the individual photovoltaic cells via the switchbox on the measurement unit; (6) comparing measured short circuit currents of each of the individual photovoltaic cells with other of the individual photovoltaic cells of the soil monitoring panel and a Reference Panel; and (7) determining soiling conditions of the soil monitoring panel based on measured and compared short circuit currents of the individual photovoltaic cells with a Reference Panel.

In one embodiment, the method of determining a soiling condition of a photo-voltaic system further includes: providing a reference solar panel including at least one reference photovoltaic cell, which may be mounted onto the same glass substrate as the plurality of pv soil monitoring cells; measuring a short circuit current of the at least one reference photovoltaic cell and storing the results on the data storage system; comparing measured short circuit currents of each of the individual soil monitoring photovoltaic cells with the measured short circuit current of the reference photovoltaic cell; determining soiling conditions of the soil monitoring panel based on measured and compared short circuit currents of the individual photovoltaic cells and the reference photovoltaic cell.

In one embodiment, the method of determining a soiling condition of a photovoltaic system further includes: providing an Automated Clean Reference System including an enclosure which is driven by a motor protect the Reference Cell Panel by enclosing the surface of the Reference Cell Panel and thereby sealing the surface of the reference pv cell(s) from exposure to Dust and debris, in-between measurements.

In a third aspect, a solar panel monitoring system is provided including: a soil monitoring panel including a plurality of arranged photovoltaic cells; a dedicated reference cell with automated clean reference system, a measurement unit including a circuit board in electronic communication with each of the plurality of photovoltaic cells of the soil monitoring panel and the photovoltaic reference cell; a communications unit (FIG. 1, 6), for receiving a short circuit current from each individual photovoltaic cell of the plurality of photovoltaic cells of the soil monitoring panel and the reference panel; and a data acquisition system including a processor, a computer readable storage medium, and one or more computer programs operable on the data acquisition system; a reference solar panel including at least one photovoltaic cell in electronic communication with the data acquisition system, wherein the data acquisition system receives a short circuit current of the at least one photovoltaic cell of the Soil Monitoring panel and the pv reference panel, and wherein the data acquisition system further determines conditions of the soil monitoring panel based on compared measured short circuit currents of each of the plurality of photovoltaic cells of the soil monitoring panel and the at least one photovoltaic cell of the reference solar panel. The data acquisition system receives a short circuit current of at least one photovoltaic cell of the reference solar panel and a short circuit current of each of the plurality of arranged photovoltaic cells of the soil monitoring panel. The data acquisition system determines conditions of the soil monitoring panel based on compared measured short circuit currents of each of the plurality of photovoltaic cells of the soil monitoring panel and the at least one photovoltaic cell of the reference solar panel.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

At the outset, it should be understood by one of ordinary skill in the art that embodiments of the present solar panel soiling monitoring system can include software or firmware code executing on a computer, a microcontroller, a microprocessor, or a digital signal processor (DSP); state machines implemented in application specific or programmable logic; or numerous other forms. Embodiments of a solar panel soiling monitoring system of the present disclosure can include one or more computer programs, which include non-transitory machine-readable media having stored thereon instructions that can be used to program a computer (or other electronic devices) to perform processes according to the presently claimed solar panel soiling monitoring system. The machine-readable media can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 1:
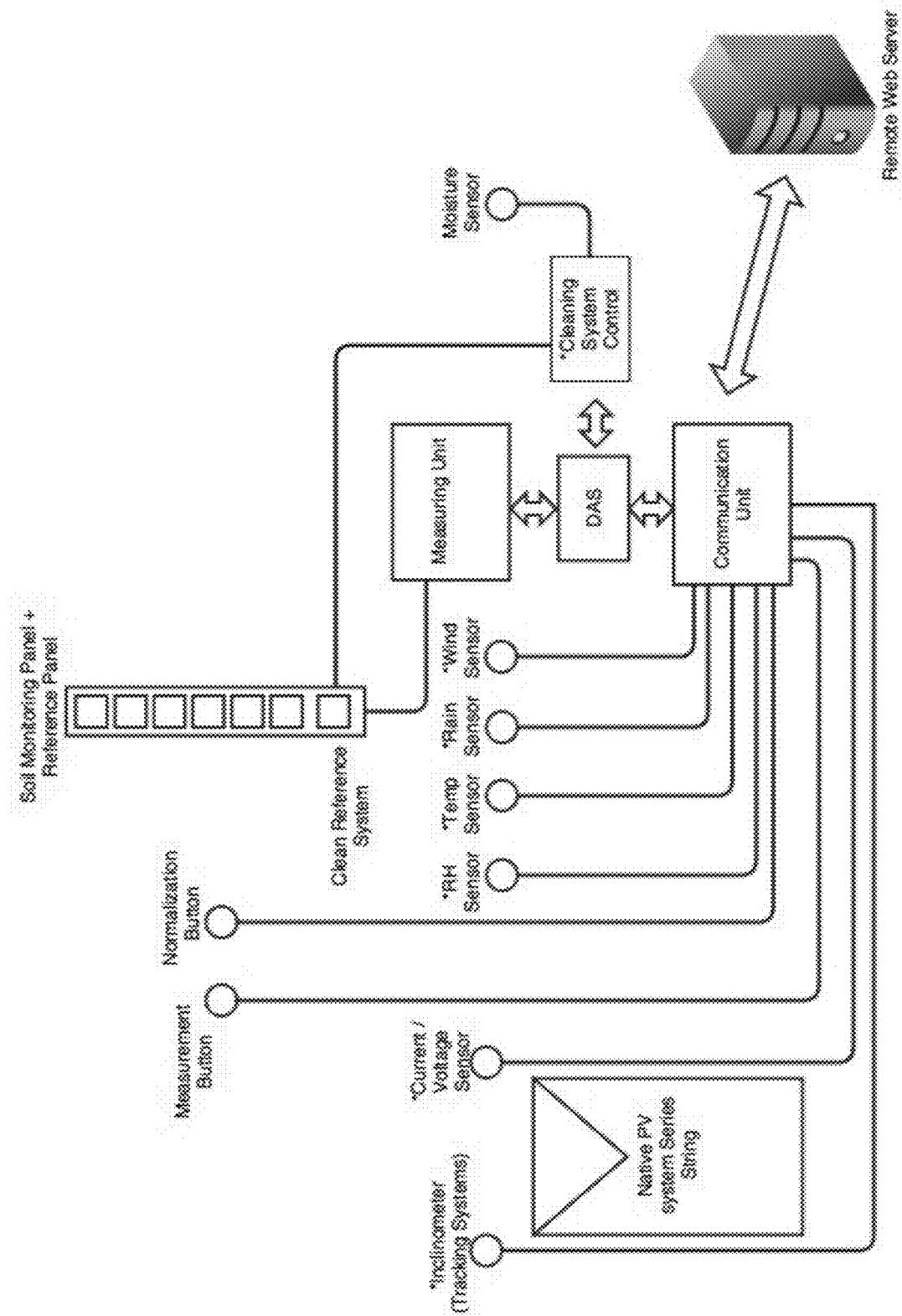
FIG. 1 schematic diagram of a solar panel soiling monitoring system according to one embodiment of the present disclosure.
Figure 2:
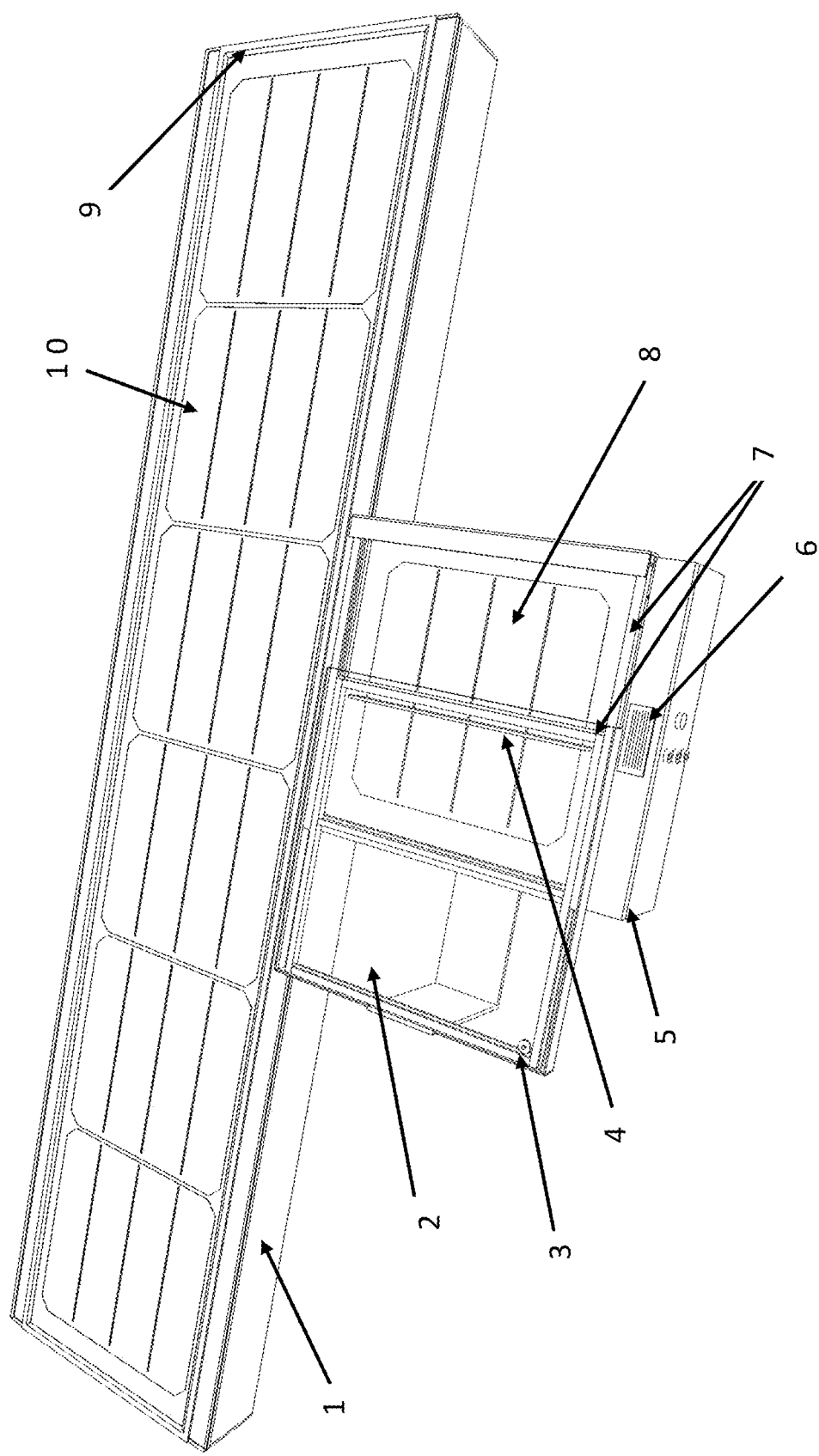
FIG. 2 is a top perspective view of a soil monitoring panel with a reference cell panel arranged on the side of the soil monitoring panel according to one embodiment of the present disclosure.
Figure 3:
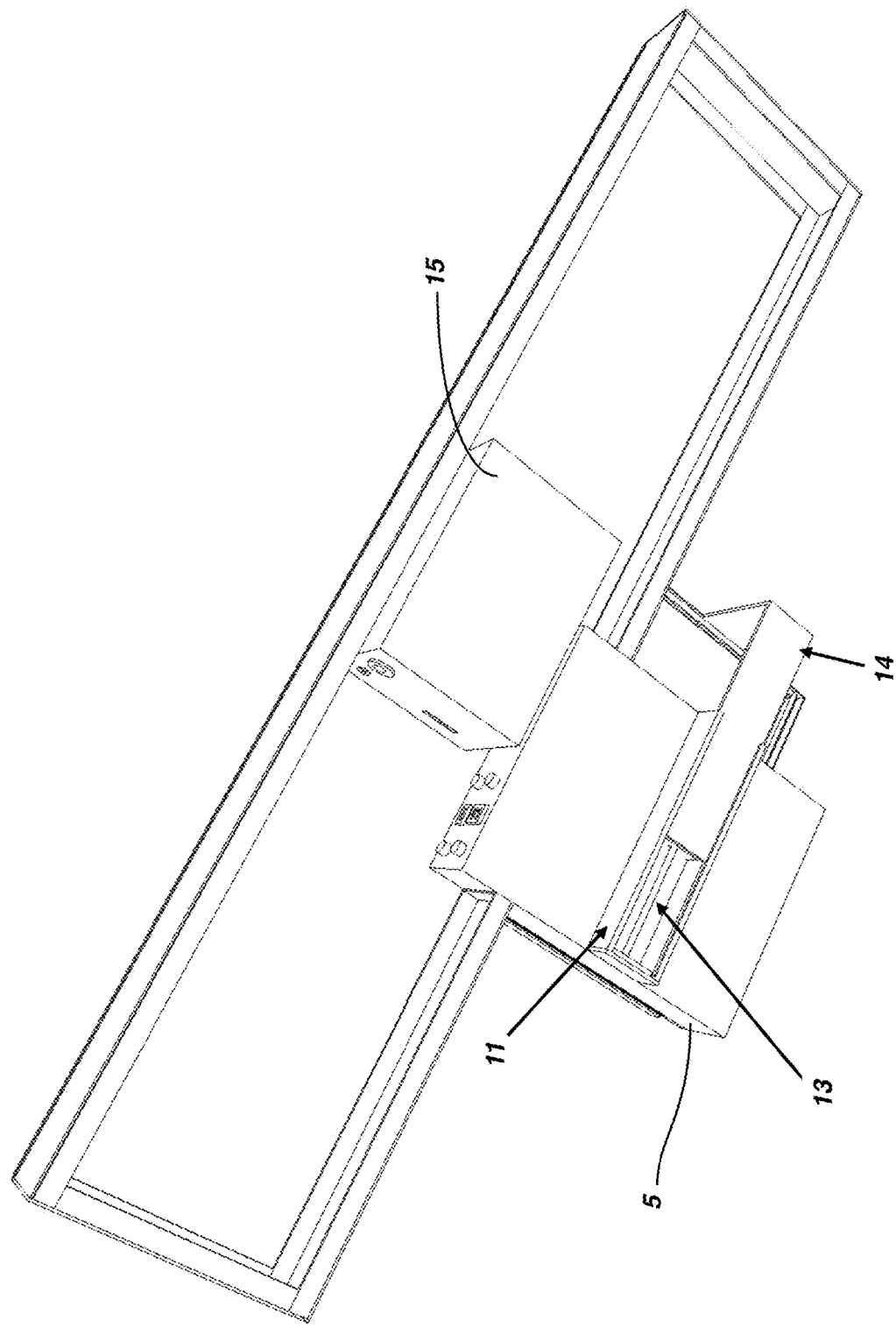
FIG. 3 is a bottom view of a soil monitoring panel with a reference cell panel arranged on the side of the soil monitoring panel according to one embodiment of the present disclosure.
Figure 4:
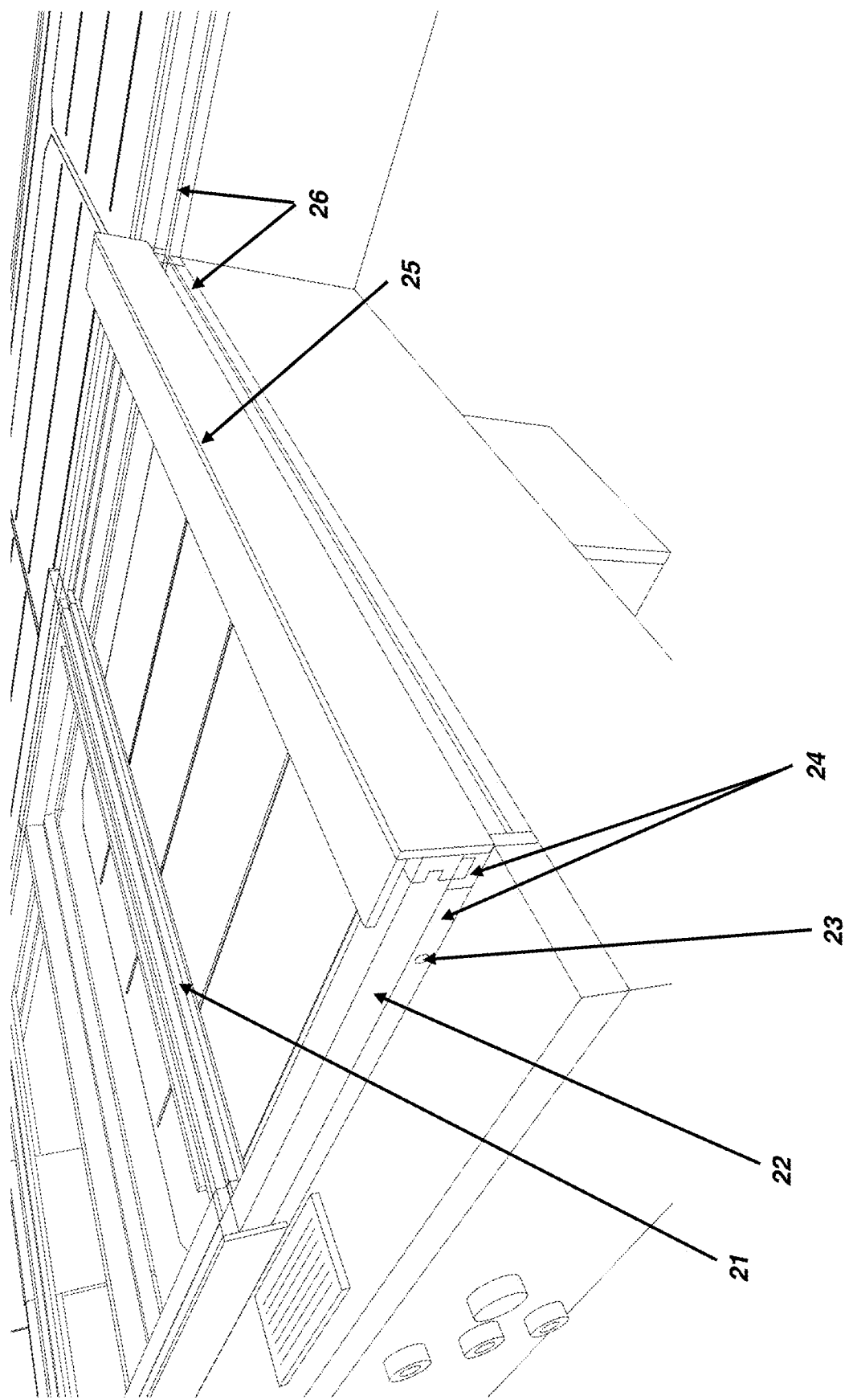
FIG. 4 is a close-up view to a top of the reference cell panel showing mechanical arrangement of a sealing gasket frame mounted onto the surface of the reference cell panel and the reference cell cover sealing gaskets mounted into the sealing gasket frame according to one embodiment of the present disclosure.
Figure 6:
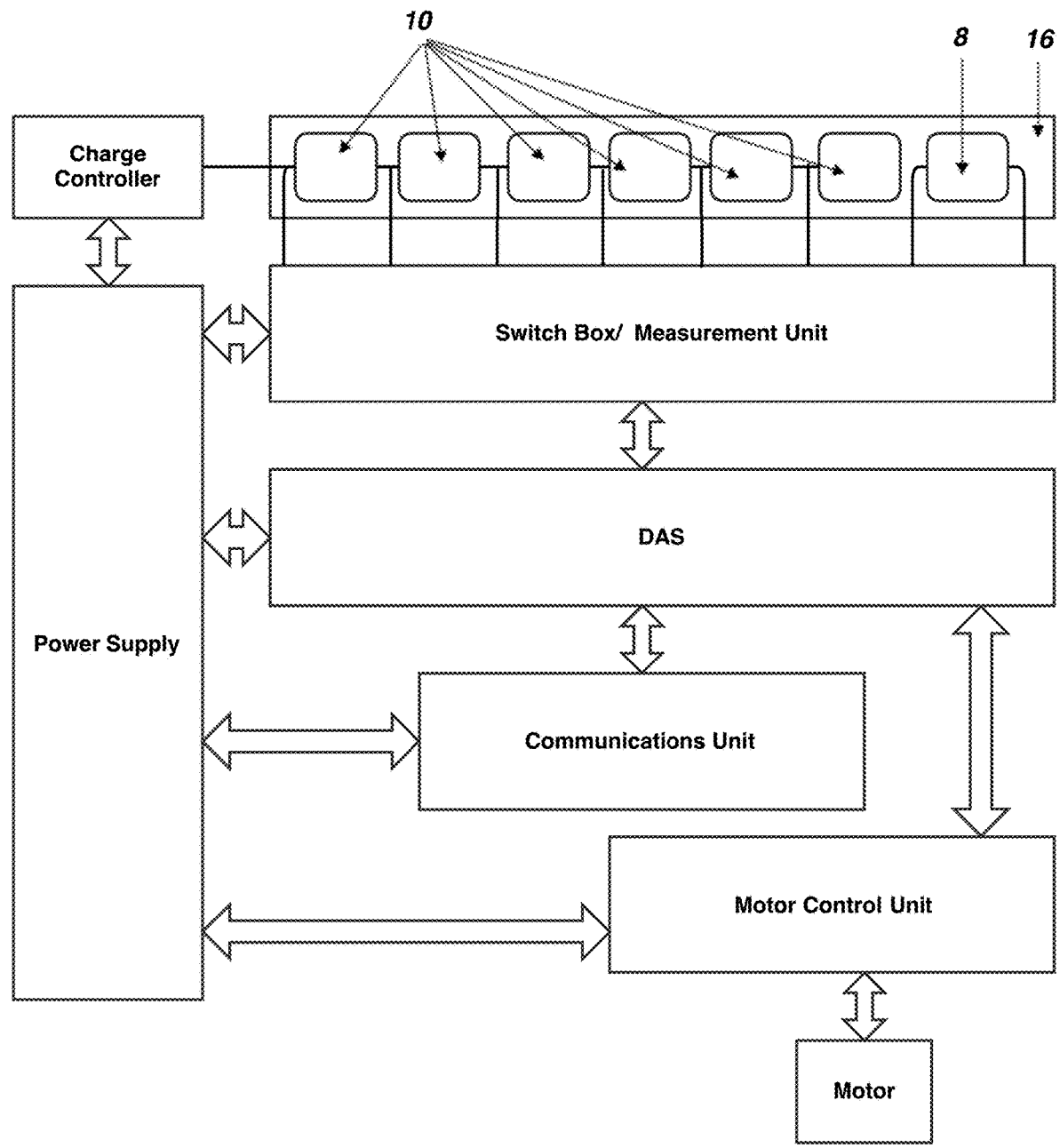
FIG. 6 is a block diagram of an electrical system including a relationship between soil monitoring cells, flexible PCB, measuring unit, DAS, and communications unit according to one embodiment of the present disclosure.
Figure 7:
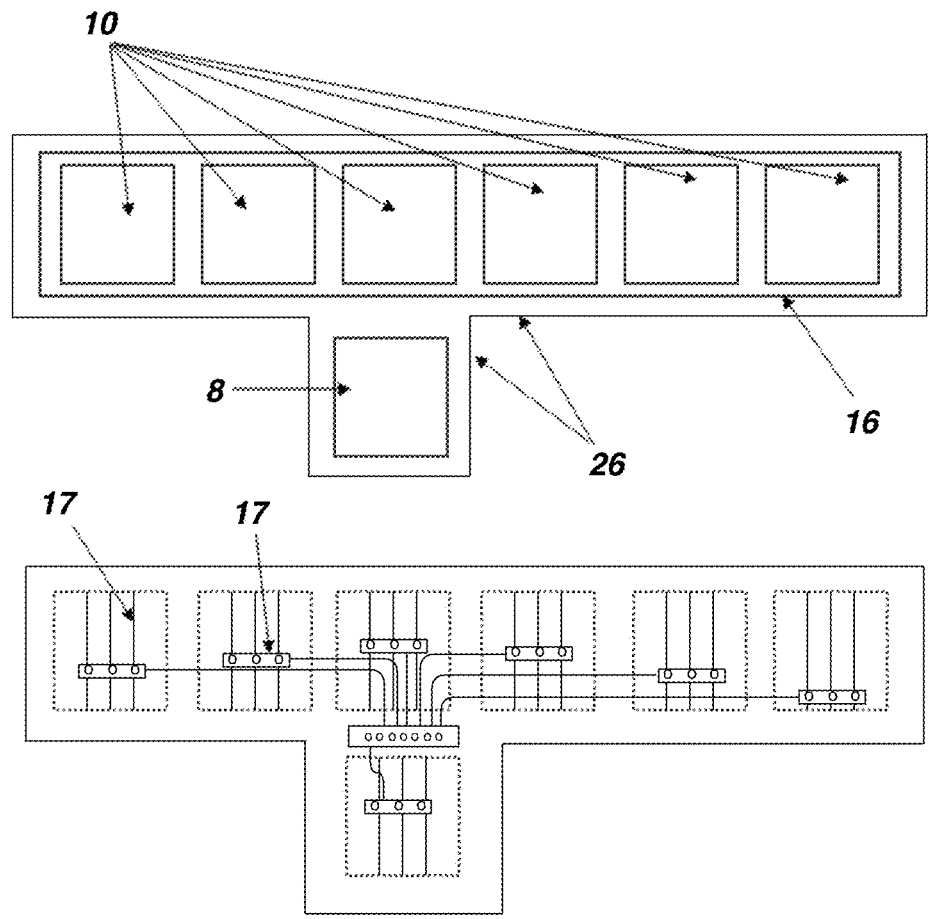
FIG. 7 shows top and bottom views of a soil monitoring panel and reference cell panel including a flexible PCB according to one embodiment of the present disclosure.

Referring to FIG. 1 and FIG. 2, the solar panel soiling monitoring system includes a soil monitoring panel 10, clean reference solar panel 8, and an automated clean reference system. The reference solar panel includes 8 at least one, dedicated PV cell which is installed onto the same glass sheet as the soil monitoring panel 10 (FIGS. 2-4 and 7), which is used to provide measurements of a soiled panel versus the clean reference cell 8. The reference solar panel 8 may be mounted to either side of the soil monitoring panel 10 or on either extreme end of the soil monitoring panel 10. Cleaning system control units are connected to the automated clean reference system (FIGS. 1 and 6), which include an automated enclosure system which retracts a cover 2 encapsulating the reference cell panel, when a soiling measurement is to be taken, thereby exposing the clean reference solar cell to the sun. The reference cell cover 2 may include a reference cell cover bleed valve 3 located on the reference cell cover. The solar soil monitoring panel 10 (having a plurality of PV cells) and reference cell panel (FIGS. 2-4 and 6-7) are connected to a measurement unit (FIGS. 1 and 6) which provides measurement of the short circuit current (referred to herein as "Isc") of a plurality of photovoltaic cells of the soil monitoring panel 10 (FIGS. 2-3 and 6-7) individually and in coordination with a measurement of the Isc of the reference cell panel 8 (FIGS. 2-4 and 6-7). The measurement unit (FIGS. 1 and 6) is connected to one or more data storage system (FIGS. 1 and 6) (i.e. EEPPROM). The measurement unit (FIGS. 1 and 6), may also be connected to a communications unit (FIGS. 1 and 6). The data storage unit may be a separate third-party system (ie. Data Acquisition System ("DAS")) consisting of a storage and control system or may be integrated into the measurement and/or communications units.

A number of environmental sensors including a relative humidity sensor, a temperature sensor, moisture sensor and a wind sensor, (amongst others) may be connected to the DAS and or communications unit motor control unit DAS and or measurement units, as shown in FIG. 1.

Figure 5:
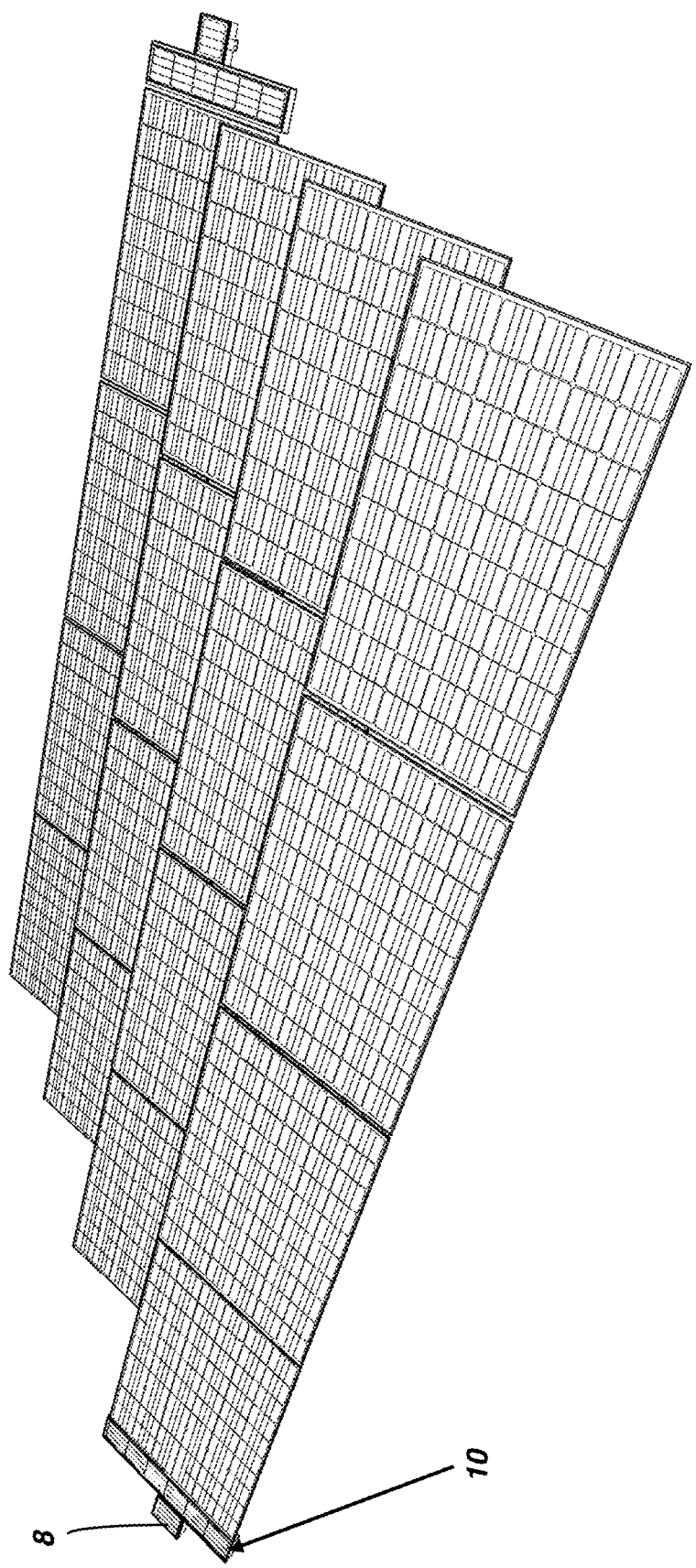
FIG. 5 illustrates a configuration of a soil monitoring system installed at ends of a row of PV panels to measure the effects of soiling on the adjacent PV panels in the native PV array according to one embodiment of the present disclosure.

Additionally, a current/voltage sensor connected to the native PV system, as shown in FIGS. 1 and 5, may be also connected to the DAS and/or measurement unit to relay current/voltage information about the native PV system to the communications unit.

A normalization button (FIG. 1) may be connected to the communications unit of the soil monitoring panel 10 to recalibrate measurements to a normalized form periodically to ensure additional differences in performance (ie. performance degradation over time) between the reference panel and solar panel cells are not included in the soiling calculations. The Communications unit may have a connection to a modem, which exchanges the solar panel data and calculations between a remote server (FIG. 1) and the local data storage system. While the server, may be remote, the remainder of the system, is considered to be located on the site where the PV system losses are to be measured.

Electronic Enclosure

In one embodiment an electronics enclosure 5 (FIGS. 2 and 3) may house a motor controller 15 including a power supply and a motor 14. In another embodiment the electronics enclosure 5 may house the motor 14, motor controller 15, DAS, a temperature sensor, a charge controller, power supply, a communications unit, and measurement unit.

The electronics enclosure 5 may be of a standard construction to those electronic enclosures common in the field, rated for outdoor use, and consisting of a rectangular box with two halves (top and bottom) which are joined by removable screws. The bottom half of the electronic enclosure 5 (the side opposite the half with access to the removable screws), may contain a small rectangular hole to provide a passage for a portion of a flexible PCB, into the electronics enclosure 5 where it can connect directly to the measurement unit.

Soil Monitoring Panels

Embodiments of the present disclosure seek to solve the problems of existing systems by connecting each cell of a plurality of PV cells to a measurement unit, whereby the Isc of each cell can be measured individually providing detailed information regarding the effects of soiling at each part of the PV panel.

The soil monitoring panel 10 may include a mounting frame 1 and an adjustable frame 9 (FIG. 2) proportional to those of standard solar panels. The adjustable frame 9 may be adjustable in size in order to match the specific distance between the PV cells and the frame on a given solar panel. Soiling typically accumulates on the bottom edges of the solar panel frame and builds upward (referred to as "edge soiling"). Once the soiling accumulation reaches the region directly over the PV cell, it begins to affect the light collection of the PV cell. Therefore, the distance between the PV cell and the panel frame can have a significant effect on the soiling losses. The distance between the PV cells and the panel frame can vary widely between manufacturers, which further complicates measuring the effects of edge soiling on different PV panel technologies. The current invention solves this issue by providing an adhesive or mechanically adjustable superficial frame surrounding the surface of the soil monitoring panel so that the distance between PV cells and panel frame are matched with the PV panels of the native PV array.

Reference Cell Panel

The reference cell panel 8 may be without a frame to enable easy cleaning by the automated clean reference system. The soil monitoring panel 10 and the reference cell panel 8 may share a single glass substrate 26 with dedicated PV cells for soil monitoring and dedicated cells for clean reference.

In another embodiment, the soil monitoring panel 10 and the reference cell panel 8 may consist of separate units which are mounted adjacent to each other. The soil monitoring panel 10 may be connected to the reference cell panel 8 by the electronics enclosure 5 which extends across the bottom of the reference cell panel 8 and the soil monitoring panel 10. In this way the reference cell panel 8 and the soil monitoring panel 10 may be mounted to the electronics enclosure 5 using a standard adhesive, which ensures that the reference cell panel 8 and the soil monitoring panel 10 are mounted adjacent to each other and at the same elevation angle. In this way the reference cell panel 8 and the soil monitoring panel 10 are connected to each other and function as a single unit.

The current of a PV panel is directly proportional to the irradiance incident on the surface of the cells. As standard PV panels consist of a plurality of cells wired in-series, the current of the PV panel is limited to the current of the weakest cell in the series connected string of cells. In order to accurately measure losses due to soiling, and better understand the specific losses due to pattern soiling it is important to measure the short circuit current of each cell individually as it is situated inside the PV panel.

It is impossible to determine the pattern of soiling present on a PV panel by only measuring the current of a series-connected PV panel. In addition, normalization is complicated by the PV cell mismatch which can lead to substantial errors in measurement on a standard PV panel. By connecting each cell of the reference cell panel 8 and the soil monitoring panel 10 to a measurement unit, errors due to mismatch between PV cells can be eliminated, significantly improving the accuracy and reliability of the soiling loss measurements. Additionally, soil patterns can be easily assessed to determine the specific soiling losses, prevent hotspots, more accurately model the effects of soiling on different PV technologies and determine suitable cleaning techniques. As shown in FIGS. 1 and 6, the cells of the reference cell panel 8 and the soil monitoring panel 10, are connected individually to the measurement unit.

The cells of the reference cell panel 8 and the soil monitoring panel 10 may also be connected in-series to provide power to a battery charger for autonomous power.

Measurement Unit

With respect to the measurement unit, a minimum of two panels of the type described above one reference cell panel 8 and one soil monitoring panel 10 are measured simultaneously. Each panel of the soil monitoring system (reference cell panel 8 and the soil monitoring panel 10) may be installed on a single glass substrate and connected to a single measurement unit or each panel may be connected to a separate measurement unit dedicated to measuring the Isc of each panel.

In another embodiment, the reference cell panel 8 and the soil monitoring panel 10 may be formed of separate units which are mounted adjacent to each other. In this case the soil monitoring panel 10 may be connected to the reference cell panel 8 by the electronics enclosure 5 which extends across a bottom of the reference cell panel 8 and the soil monitoring panel 10. The reference cell panel 8 and the soil monitoring panel 10 may be mounted to the electronics enclosure using a standard adhesive, which ensures that the reference cell panel 8 and the soil monitoring panel 10 are mounted adjacent to each other and at the same elevation angle. In this way the reference cell panel 8 and the soil monitoring panel 10 are connected to each other and function as a single unit.

Each cell of the reference cell panel 8 and the soil monitoring panel 10 is connected to the measurement unit via the flexible PCB. A switching circuit inside the measurement unit will connect the measurement devices to each cell in the reference cell panel 8 and the soil monitoring panel 10. The measurement unit will measure the individual short circuit current (Isc) from each cell in the soil monitoring panel 10 and the corresponding cell or cells in a clean reference panel 8.

The measurement unit includes a microprocessor (MCU) in operable communication with analog-to-digital converter multiplexer, MOSFET transistors and precision Hall sensors. In one embodiment of the measurement unit includes a data storage system or data acquisition system having a memory unit that will be included on the same printed circuit board (PCB) as the switching circuits. In another embodiment, any third-party data storage system or DAS can be connected to the measurement unit as a separate unit. Using these components, the measurement unit upon a pulse signal from the DAS unit on a periodic basis (e.g., one time per hour), automatically takes an instantaneous short circuit current (Isc) measurements from each corresponding pair of cells from the soil monitoring panel 10 and the clean reference 8.

In another embodiment, a switching circuit in the measurement unit can configure the cells in any combination of physical circuits (series and parallel) and measure the resulting Isc and or Voc of each circuit. The measurement unit then sends the measurements to a local storage device which stores the resulting measurements from each pair of corresponding cells from the reference cell panel 8 and the soil monitoring panel 10 or each pair of corresponding circuits from each respective panel.

Soiling Loss Calculations

After collecting the Isc measurements from each cell of each panel, a script in the MCU of the DAS unit and/or measurement unit performs a mathematical algorithm upon the individual measurements taken from each cell to determine the following (but not limited to) additional soiling characteristics, such as average soiling loss percent (average loss of all cells on soil monitoring vs. those on the clean reference solar) percent of non-uniformity of soiling, (delta between the weakest cell on the soil monitoring panel and the strongest cell on the soil monitoring panel 10), soiling losses from cells located in the corners of the panel, the loss due to soiling on each row of cells and along the borders of the panel, the total soiling loss for the panel (weakest cell current) and determination of any forward-biased bypass diodes.

A first program written into the MCU of the measurement unit or DAS unit or a remote server, is able to self-monitor the soil monitoring panel 10 to determine if there are large differences in cell Isc values compared to other cells in the same soil monitoring panel 10. In this way, the capability exists to determine if the cells of the soil monitoring panel 10 may have an aberration due to uncharacteristic spot soiling, such as an aberrant leaf or bird dropping, which may not be representative of the native soiling pattern in general. Using a user interface provided via an Internet web application, the user is able to configure the alarms and calculations to include or ignore these aberrations to better match the average soiling of the native PV system.

A second program written into the MCU of the measurement unit is also able to calculate the effects of active bypass diodes in the native panels. PV panels typically include 2 or 3 bypass diodes which help to protect the PV panel from loss of current and/or damage to the PV cells by redirecting current around weak or damaged cells. However, the number, and type of bypass diodes varies widely as well as the PV cell characteristics, which further complicates the measurement of the effects of soiling on different PV panel technologies and manufacturers. The current invention solves this issue by using the Isc measurements of each cell, the PV cell resistance, and bypass diode configurations, to calculate power lose due to active bypass diodes. In this way a close simulation of the characteristic performance of the native PV panels is maintained and the effects of soiling can be effectively modeled for different PV panel technologies.

Bypass Diodes

For embodiments with bypass diodes included in the native photovoltaic panels, the resulting effects of soiling on PV panels with bypass diodes can be measured by calculating the Voltage as a function of Isc and Characteristic shunt resistance of each PV cell in the soil monitoring panel 10. Differences in cell voltages between surrounding cells of the soil monitoring panel 10 can be compared with the breakdown voltage of diodes of the native panels to determine when the diodes will be forward biased, thereby eliminating these cells from contributing any power (reducing the power of the panel by subtracting the power of each cell that would be bypassed by the forward bypassed diode in the native panel). The loss of power due to active bypass diodes can be calculated by subtracting the calculated power from each cell(s) of the soil monitoring panel 10 affected by active bypass diodes.

Charging System

A battery and charge controller (FIG. 6) may be used to collect energy from the soil monitoring panel 10 and/or the reference panel 8 that is not used during the measurement process to power the measurement unit, electronics (MCU, ADC, MOSFETs, and the like), eliminating the need for AC power connections and facilitating completely independent and remote installation, if desired.

Automated Clean Reference System

The automated clean reference system of the present disclosure provides a fully automated, mechanism for protecting and maintaining a PV reference cell in a clean state to ensure a reliable performance baseline. The device does not require any cleaning liquids, tubes, tanks, pumps, or nozzles.

The automated clean reference system described in this disclosure may be included as part of a PV soil monitoring system as described in this disclosure or may be used separately in order to maintain a reference baseline.

The preferred embodiment of the automated clean reference system includes the following main components. Note that the components with * are included as part of the soil monitoring system as described previously and may or may not be included in other embodiments of the automated clean reference system.

Parts that make up the automated clean reference system include:
1. reference cell panel 8;
2. electronic enclosure 5;
3. reference cell cover 2;
4. motor(s) 14;
5. motor control system 15;
6. * data acquisition system (DAS) (FIG. 1);
7. temperature sensor (FIG. 1);
8. * charge controller (FIG. 6);
9. power supply (FIG. 6);
10. * communications unit (FIG. 6);
11. * measurement unit (FIGS. 1 and 6);
12. fixed brush 4;
13. reference cell cover drive screw 13;
14. drive screw cover 11;
15. reference cell cover drive bar 14;
16. reference cell cover sealing gasket 7;
17. mounting frame 1;
18. moisture sensor 6;
19. * soil monitoring panel 10;
20. toothed rails 30;
21. motor gearheads 32.

The DAS, charge controller, communications unit, measurement unit, and soil monitoring panel 10 are included in the preferred embodiment as described previously in the PV soil monitoring system above. In other embodiments one or more of these components may not be included as part of the automated clean reference system.

In one embodiment, the reference cell panel 8 may be installed adjacent to a soil monitoring panel 10 and constructed on the same glass substrate as the soil monitoring panel 10. In another embodiment, the reference cell panel 8 may be installed on a separate glass substrate from the soil monitoring panel 10.

In one embodiment the electronics enclosure 5 may house the motor controller 15, power supply and motor 14. In another embodiment the electronics enclosure 5 may house the motor 14, motor controller 15, DAS, temperature sensor, charge controller, power supply, communications unit, measurement unit.

The electronics enclosure 5, may be of a standard construction to those electronic enclosures common in the field, rated for outdoor use, and consisting of a rectangular box with two halves (top and bottom) which are joined by removable screws. The bottom half of the electronic enclosure 5 (the side opposite the half with access to the removable screws), may contain a small rectangular hole to provide a passage for a portion of the flexible PCB, into the electronics enclosure 5 where it can connect directly to the measurement unit.

A flexible printed circuit board is constructed of a thin flexible material suitable for use in a PV panel. The flexible PCB is used in the construction of the soil monitoring panel 10 and reference panel 8 to safely route electrical circuits from the PV cell busbars to the measurement unit located in the electronics enclosure 5. The flexible PCB may also provide connection between a PV soil monitoring panel 10 and or reference cell panel 8 to the charge controller.

The bottom half of the electronic enclosure 5 (the side with the rectangular shaped hole for the flexible PCB to pass) may be covered in a layer of adhesive in order to glue the electronic enclosure 5 to the bottom of the reference cell panel 8 and/or the bottom of the soil monitoring panel 10.

The temperature sensor is connected to the bottom of the reference cell panel 8 and to the DAS and/or measurement unit.

A portion of the electronic enclosure 5 houses the electronic motors 14 and motor controller 15. The motors 14 are connected electrically to the motor controller 15, which is also connected to the power supply and DAS.

In one embodiment, the motors 14 may be oriented such that the motor axle is facing downward away from the reference panel 10. The motor axle may protrude through a hole in the top of the electronic enclosure 5 where it is directly connected to the reference cell cover drive screw 13, such as via a 90 degree gear. The reference cell cover drive screw 13 is mounted along the bottom of one side of the electronics enclosure 5 directly below the motor axle on the outside of the electronics enclosure 5. A hole in the bottom of the electronics enclosure 5 is sealed around the motor axle in order to ensure that no water or contaminants are able to enter the electronics enclosure 5.

The reference cell cover drive screw 13 is protected from environmental contaminants (dust, water, etc.) by the drive screw cover 11. The drive screw cover 11 is mounted to the bottom of the electronics enclosure 5 in such a way as to encircle the perimeter of the reference cell cover drive screw 13.

In one embodiment, a groove on either side of the drive screw cover 11 is constructed so that the edges of either side of the reference cover drive bar 14 can fit into the grooves in the drive screw cover 11 in such a way as to completely enclose the reference cell drive screw 13 when the reference cell drive bar 14 is fully retracted (in the closed position).

The reference cell drive bar 14 is connected to the reference cell drive screw 13 on the bottom of the electronics enclosure 5 using common mounting hardware. The reference cell drive bar 14 is also fastened to the reference cell cover 2 so that as the reference cell drive screw 13 is turned by the motor the reference cell drive bar 14 moves forward/ backwards laterally, forcing the reference cell cover 2 to also slide laterally (i.e. open and close) over a surface of the reference cell panel 8.

The reference cell drive bar 14 slides along a C channel groove on either side of the reference cell cover 2 and provides a complete enclosure for the reference cell drive screw 13 when it is in the fully closed position.

In one embodiment the reference cell drive screw 13 is a helical screw which is used to attach a mounting bracket to drive a load in a lateral direction as the screw turns. A 90 degree, rotational gear may be used to translate the motion of the motor axle to the reference cell drive screw 13.

In another embodiment the reference cell drive screw 13 may be a linear actuator which is used to drive a load in a lateral direction.

The reference cell cover 2 may consist of a any suitable material (i.e. glass, plastic, metal . . . etc.) which is mounted to the reference cell drive bar 14 on one side of the reference cell cover 2 using common fasteners.

Figure 9:
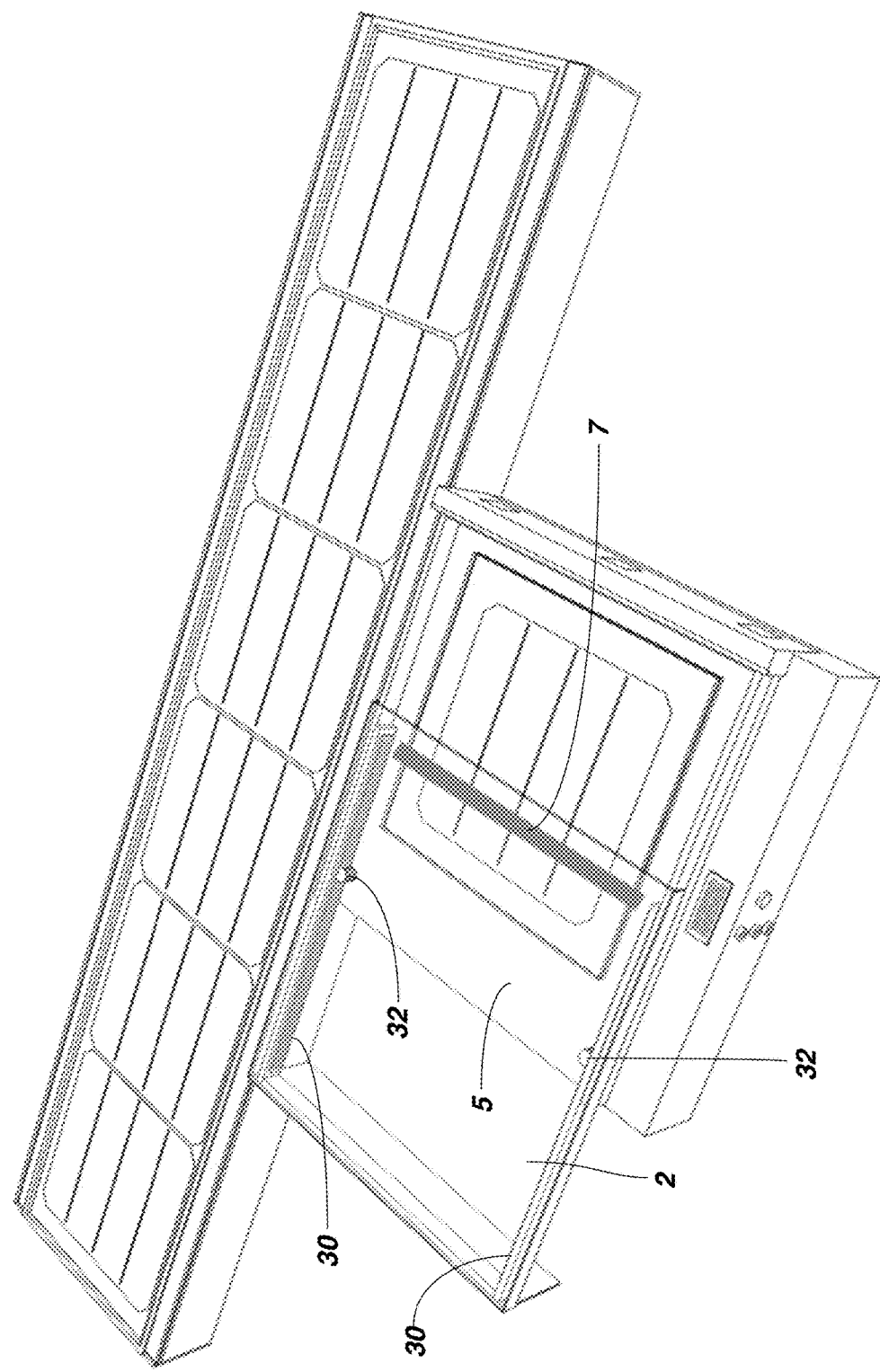
FIG. 9 is a top perspective view of a soil monitoring panel with a movable cover panel according to one embodiment of the present disclosure.

In one embodiment, as shown in FIG. 9, the reference cell cover 2 may include toothed rails 30 on sides of the reference cell cover 2 in order to drive the reference cell cover 2 between open and shut positions.

In another embodiment the motors 14 may be oriented such that the motor axles are facing upwards toward the reference panel 10. A small hole on either side of the electronic enclosure will provide a means for the motor axels to extend through the electronic enclosure 5 on either side of the electronic enclosure 5. Motor gearheads 32 are mounted onto the motor axles in such a way that they are in direct contact with the toothed rail 30 on either side of the reference cell cover 2.

The reference cell cover 2 may additionally include a sealing gasket frame 24 and or a inside sealing gasket 21 which is mounted to the inside of the reference cell cover 2 in such a manner as to be aligned with the counterpart sealing elements of an outside sealing gasket 22.

The reference cell cover 2 may additionally include a fixed brush 4 which may be mounted to the inside of the reference cell cover 2. The fixed brush 4 may be of any suitable material or type so as to rid the surface of the reference cell panel 8 of debris as the reference cell cover 2 is opened. The fixed brush 4 may be mounted on the inside of the reference cell cover 2 so that it hangs downward towards the surface of the reference cell panel 8 and comes in direct contact with the reference cell panel 8. In this way the fixed brush 4 clears a surface of the reference cell panel 8 as the reference cell cover 2 slides laterally across the surface of the reference cell panel 8.

In one embodiment, the sealing gasket frame 24 may be mounted to the top surface of the reference cell panel 8 and or the inside surface of the reference cell cover 2 in a such a way as to completely encircle the perimeter of the PV cell or cells provided in the reference cell panel 8. The sealing gasket frame 24 consists of a rigid metal or plastic frame which provides a supporting structure for the inside sealing gasket 21 and/or the outside sealing gasket 22.

In another embodiment, the sealing gasket frame 24 may be constructed with a C-shaped channel for inserting the rectangular shaped, bottom portion of the sealing gaskets 7 into the sealing gasket frame 24. The sealing gasket frame 24 may also contain a series of screw holes in the bottom portion of the frame for fixing the sealing gaskets 7 to the sealing gasket frame 24. In this way the sealing gasket frame 24 also provides a means for easy installation and replacement of the sealing gaskets 7.

The sealing gasket frame 24 may be mounted to the reference cell panel 8 and/or the reference cell cover 2 using an adhesive or fasteners standard in the trade. The sealing gasket frame 24 provides a permanent rigid frame around the perimeter of the reference cell cover 2 and or the perimeter of the reference cell panel 8, where the outside sealing gaskets 22 and/or the inside sealing gaskets 21 can be installed into or removed from, the C-channel of the sealing gasket frame 24 and fixed or removed into the sealing gasket frame 24 by a gasket frame set screw 23 which is provided on the side of the sealing gasket frame 24. This provides for easy assembly of the reference cell cover 2 as well as a means of replacing the outside sealing gaskets 22 and inside sealing gaskets 21 in the case that they become sufficiently worn.

A portion of the inside sealing gasket 21 is designed to fit inside a C-channel grove provided by the outside sealing gasket 22, which provides support for the reference cell cover 2 as it is extended beyond the edge of the reference cell panel 8 and also provides a continuous, hermetic seal between the reference cell cover 2 and the top surface of the glass of the reference cell panel 8 when the sealing gaskets 7 are forced together by the closing motion of the reference cell cover 2.

The inside sealing gaskets 21 and outside sealing gaskets 22 may be of any shape or material which is commonly used to create a hermetic seal between the reference cell cover 2 and the reference cell panel 8 when the reference cell cover 2 is in the completely closed position over the reference cell panel 8.

The reference cell panel 8 is electrically connected to the measurement unit, DAS, and temperature sensor. The temperature sensor is connected to the DAS. The power source is connected to the DAS, temperature sensor, the motor controller 15, and communications unit. The motor controller 15 is connected to the motor 14.

In one embodiment, the PV cells of the reference cell panel 8 and/or the soil monitoring panel 10 may be connected in-series to a charge controller and battery when the PV cells are not needed for soiling measurements. In this way the PV cells provide autonomous power without the need for remote power sources.

In one embodiment, the moisture sensor 6 is mounted in the same plane as the reference cell panel 8 on the outside of the electronics enclosure 5. The moisture sensor 6 may be electrically connected to the DAS and power supply. The moisture sensor 6 provides indication of wet weather conditions (i.e. rain) to determine if the protective reference cell cover 2 should be opened, thus exposing the clean reference cell panel 8 to potential environmental contaminants (i.e. water and contaminants contained therein), which might undermine the accuracy of the soiling measurements. If for example, the moisture sensor detects that water is present on the panel, the reference cell cover 2 may remain in the closed position to avoid exposing the reference cell panel 8.

The communications unit may be connected to the DAS and/or the measurement unit.

In one embodiment, the communications unit, DAS and measurement unit, charge controller, power source, may be separate units located outside of the electronics enclosure 5 or inside the electronics enclosure 5.

In one embodiment the moisture sensor 6 may be mounted on the top of the electronics enclosure 5 and is electrically connected to the DAS and power supply.

In another embodiment, additional environmental sensors (such as humidity, wind speed . . . etc.) may be electrically connected to the DAS and power supply.

Function of the Automated Clean Reference System

The reference cell panel 8 is installed in the same plane of array as the native PV panels so as to best match the conditions of the native PV panels. Typically the reference cell panel 8 and soil monitoring panels 10 are installed on a single glass substrate, which is mounted alongside the native PV array at the end of a row of PV panels. The general intent of the PV reference cell enclosure system is to keep the reference cell panel 8 in a sealed enclosure in between measurements to prevent the accumulation of dust and/or dirt onto the surface of the reference cell panel 8 and in this way maintain a reliable and clean reference for soiling measurements.

The motorized reference cell cover 2 is controlled by the motor 14 which is controlled by the motor controller 15 so that it only opens to expose the reference cell panel 8 a brief time when taking a measurement of the reference cell panel 8. Before and after the measurements are taken the reference cell cover 2 is closed in order to protect the reference cell panel 8 from further exposure to outside contaminants.

Before any measurements are taken, the moisture sensor 6 may be first measured and sent to the DAS and/or communications unit to detect the presence of water on the surface of the reference cell panel 8 which would indicate water (i.e. rain). Additional environmental sensors (i.e. humidity, wind speed . . . etc.) may also be connected to the DAS to detect the presence of adverse conditions for measurements. The measurements are calculated and compared against stored thresholds. If the measurements exceed a given threshold it would indicate that adverse conditions exist (i.e. rain or excessive wind) and the enclosure may not be opened in order to avoid exposing the reference cell panel 8 to environmental contaminants.

Upon receiving a signal from the communications unit, DAS and/or motor controller 15, the motor 14 rotates translating the motion to the reference cell drive screw 13. A common fastener attaches to the reference cell drive screw 13 and the reference cell drive bar 14 and in this way translates the circular motion of the motor to a lateral motion, which moves the reference cell cover 2 laterally in order to open and close the reference cell cover 2 which is attached to the reference cell cover drive bar 14 and thus exposes the reference cell panel 8 to unobstructed sunlight.

In one embodiment, the fixed brush 4 may be connected to the inside of the reference cell cover 2 so that as the reference cell cover 2 slides laterally over the top of the reference cell panel 8 the fixed brush 4 sweeps the surface of the reference cell panel 8.

Once the reference cell cover 2 is opened, exposing the reference cell panel 8 to the sun, the measurement unit takes a measurement of the reference cell panel 8 and sends the measurement to the DAS and/or communications unit. The measurement may include Isc, Voc, Imp, Vmp, or any combination of these measurements.

The resulting measurement may be stored in the DAS and/or sent to a remote server via the communications unit.

After completing the measurement, a program stored in the MCU of the DAS sends a signal to the motor controller 15 to close the reference cell cover 2. The inside sealing gasket 21 is mounted onto the reference cell cover 2 and the outside sealing gasket 22 is mounted on the reference cell panel 8 which is fixed (does not move), so that as the reference cell cover 2 moves laterally across the reference cell panel 8 the inside sealing gasket 21 slides along a grove provided by the outside sealing gasket 22, which provides support to the reference cell cover 2 as well as provide a hermetic seal between the reference cell cover 2 and the top of the reference cell panel 8 when the reference cell cover 2 is in the closed position.

Flexible PV Panel PCB

A flexible PCB 16 (FIGS. 6 and 7) provides a practical means for connecting the plurality of PV cells in the soil monitoring panel 10 and reference cell panel 8 described in the previous disclosures, to the measurement unit. During the construction of the soil monitoring panel 10 and reference cell panel 8 the flexible PCB is laid on top of the series connected PV cells and soldered to each of cell busbars 17. The flexible PCB is an insulated, thin, flexible material which contains a printed circuit designed to route the electrical connections from the busbar of each PV cell on the soil monitoring panel 10 and reference cell panel 8 to the respective connections on the measurement unit.

The insulation on the flexible PCB ensures that the electrical leads from each PV cell are safely routed to the respective pins on a connector installed on the flexible PCB (FIG. 6, 7) which correspond to the respective measurement unit connectors, without shorting other portions of the PV panel cells or reference cell panel 8. The flexible PCB is made of a compatible material to ensure that the PV panel EVA (insulation) and PV panel back sheet materials will adhere properly while being resistant to high temperatures required for the PV panel lamination process. The flexible PCB ensures that each cell of the soil monitoring panels and reference cell panel 8 is connected to the connector pins in a precise and secure way.

In one embodiment, one set of connectors (plugs) are soldered directly to the flexible PCB which is connected to the soil monitoring panel 10 and reference cell panel 8. A second set of connectors (receptacles) is provided on the electronic PCB's which are located in the electronics enclosure 5 and which connect the flexible PCB, and therefore the PV cells of the soil monitoring panel 10 and reference cell panel 8 to the measurement unit, charging system, and DAS.

Framing System

Edge soiling occurs when dirt pollen and mold accumulate at a border of the frame. The distance from the edge of the cell to the frame is not standard further complicating the measurement of the effects of edge soiling. This problem is solved in the present disclosure, by providing a superficial (i.e. does not provide a mechanical function to the soil monitoring panel 10) frame 1 on the surface of the soil monitoring panel 10 which is mechanically adjustable to match the precise distance between the frame and the boarder PV cells, of the native PV panels. In this way the present invention is able to precisely measure the effects of edge soiling on standard PV panels.

The framing system, as shown in FIG. 2, may include separate framing pieces which are placed around the perimeter of the soil monitoring panel 10 at a specific distance to the PV soil monitoring cells. The framing pieces may be of any size or material and may be fixed to the surface of the soil monitoring panel 10 glass using a standard adhesive or common fastener to hold the framing pieces in place on the soil monitoring panel 10.

Cleaning Cycle Calculation Predictive Software and Algorithms Summary

In one embodiment, the PV soil monitoring system as described previously, may include a predictive software system (FIG. 8) to estimate an optimal time to clean the PV system. This application (referred to as the "PV clean cycle forecast tool"), is a web-based software tool that allows PV system investors, project managers, EPC's, developers and O&M contractors to estimate the optimal schedule, costs and frequency of panel cleaning that will be required for a particular PV plant.

In one embodiment the predictive software utilizes actual PV system soiling loss measurements, first year hourly, PV system performance reports, and TMY weather datasets to calculate the estimated soiling losses. The cost of energy lost due to soiling is calculated at each hourly output and compared with the costs of cleaning the panels. The optimal time to clean is exactly when the cost of the loss of energy due to soiling becomes more than the cost of cleaning the panels, within a specified soiling period.

In a second embodiment, a near-term forecast application calculates the next optimal clean of the PV system using actual soiling measurements from the previously described PV soil monitoring system as well as near-term weather forecasts, energy output forecasts to determine optimal time to clean the PV panels.

To calculate the optimal time to clean the PV panels, a window of time, the soiling period, is defined as a function of the soiling rate. The soiling period is the time it takes for the accumulation of soiling to return to the same percentage before cleaning.

For the initial period the soiling period is the time it takes for the soiling to reach the maximum soiling loss percentage. For subsequent periods, the soiling period is calculated based-on the forecast soiling rate for the next period, starting from the point of the previous cleaning event (manual or rainfall).

The maximum soiling percentage is defined as the maximum percentage of loss of the PV irradiance due to soiling. As the soiling accumulates on the surface of the PV panels it generally forms layers. The soiling accumulation in general tends to be fairly linear (barring any unregular soiling events such as muddy rain and sandstorms), and tends to level-off to a near 0 accumulation rate over time. This is due to the fact that soiling accumulates on top of existing soiling layers and has only a very minimal effect in further losses to transperancy of the light passing through.

In order to calculate if and when the investment will pay off within a given soiling period, the cost of the loss of energy due to soiling equivalent to the cost of cleaning is calculated. If the cost of the loss of energy due to soiling equals the cost of cleaning within the soiling period, then a cleaning event is marked on a calendar at the beginning of the period. However, if the cost of the loss of energy does not equal the cost of cleaning within the given soiling period, then the entire soiling period is incremented forward by one unit of time (i.e. one hour) and do the same calculation until the cost of the loss of energy due to soilinge equals the cost of cleaning within the calculated soiling period.

The cleaning will never be optimal before the cost of the loss of energy due to soiling equalling the cost of cleaning. At the same time it would need to be determined if the system should be cleaned by determining whether an investment into cleaning the panels will pay off in the next period. The soiling rate and therefore the soiling period is always changing. The production of energy is also changing within each period, which is a determining factor for whether or not a given cleaning event will pay off within a given soiling period.

It may be required to look into the future to determine if a cleaning event will make sense. First the soiling loss is accumulated and the resulting energy loss beginning at the point when the cost of the loss equals cost of cleaning for the previous period (which defines the beginning of the next soiling period), moving forward until we reach the end of the soiling period or until the point where the cost of the loss equals the cost of cleaning is reached, whichever comes first. If the cost of the loss equals the cost of cleaning within the soiling period (before reaching the end of the soiling period) the clean cycle calendar is marked to indicate a required cleaning event for this date. The cleaning event also marks the beginning of the next soiling period.

If, however, the end of the soiling period is reached, before reaching the point Where the cost of loss equals the cost of cleaning, the entire soiling period is incremented forward by one unit (i.e. one hour) and recalculated to determine if the cost of the loss will equal the cost of cleaning within the new soiling period. Note that the soiling rate may change after incrementing the period and therefore the length of the soiling period would also change in the case that a change in the soiling rate happens after incrementing the period (i.e. the soiling period is incremented to the next monthly soiling rate).

The cleaning event will coincide with the pay-off point (when the cost of loss equals cost of cleaning) of the previous period when the soiling rate, max soiling loss percentage and energy production are the same as the previous period.

Figure 8:
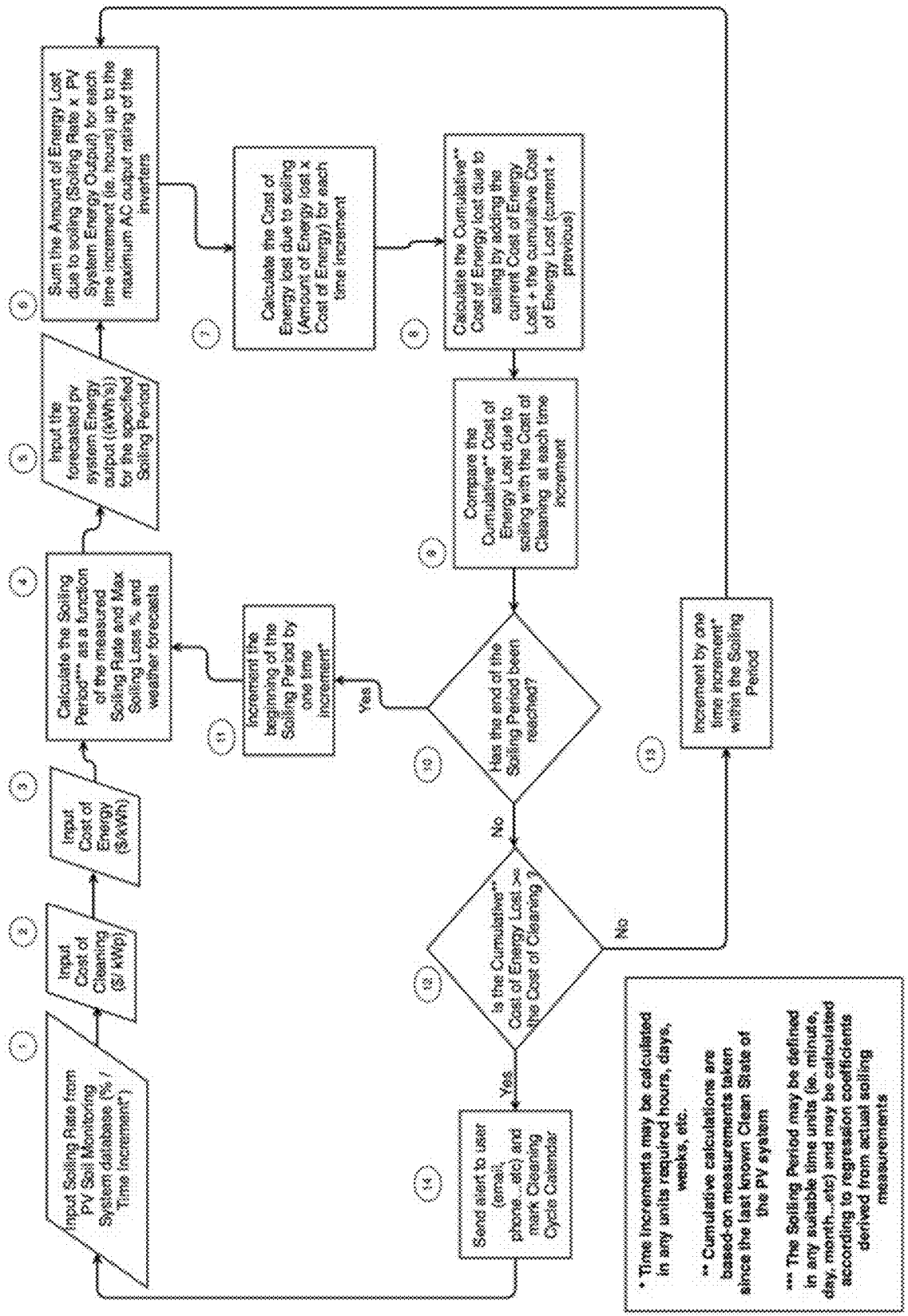
FIG. 8 is a flow chart detailing a process of a clean cycle forecast software tool used to determine an optimal cleaning cycle.

The method disclosed herein and shown in FIG. 8 relies on the on-site measurements of the PV soil monitoring system to accurately determine the characteristic soiling of a PV system. Using the cell-level measurements described previously over time can provide the required data to help predict the soiling rate and associated soiling period for a given PV plant with a high level of accuracy and reliability. In addition, the soiling rate system design details (i.e. elevation angle, orientation, type of mounting system . . . etc.) and near and long-term weather forecasts are used to determine the probabilities of a cleaning event occurring within specified soiling period.

With the advent of machine learning, a predictive model for soiling can be built from the on-site soiling measurements of said PV soil monitoring system hardware, which can produce highly accurate and reliable forecasts of the soiling rate and soiling period for a given PV system.

At different incident angles/times of day, the effects of soiling change due to internal reflections and shading effects (as the angles are longer the effects of soiling are greater). In addition to modeling soiling rates based on cross-correlations of weather data (i.e. wind and relative humidity) and environmental data (i.e. foundation, environment, etcc), the calculation may also include the time of day and latitude of the site in order to calculate the losses due to incident angle of the sun.

These general algorithms are used in both the annual PV clean cycle forecast tool, and a 7-day forecast tool. In the case of the 7-day forecast tool, the system utilizes actual soiling rates calculated from onsite measuring units which measure the amount of soiling loss for a specific site. This data is then uploaded to a web server where it is used to calculate the soiling period and associated forecast of cleaning for a given period ongoing. The list of inputs to the 7-day forecast tool is below, however users will input the required information only once and the 7-day forecast tool will automatically provide an updated clean cycle calendar calculated from the updated site soiling measurements each time a user logs into the web monitoring portal.

In one embodiment, an annual clean cycle forecast tool, may include a soiling rate calculator to help users estimate the site-specific soiling rates, in the case that the site specific soiling rates are not well known. The soiling rate calculator, is designed to help users calculate an approximate the soiling rate based-on PV system design, technology, and environmental factors. In addition, the soiling rate calculator, may utilize datasets collected from a database of customer sites and on-site measurements of soiling rates using the PV soil monitoring systems, to help estimate the site-specific soiling rates and soiling period, based-on site specific information. The soiling rate calculator, results in an average soiling rate per specified period (i.e. per month), for each month of the year, which users can further modify.

Similarly, a near-term forecast (i.e. 7-days in advance) tool utilizes actual site soiling measurements to predict the future soiling rates and the soiling period, using a cross correlation of sites specific weather data (i.e. relative humidity, temperature, precipitation, windspeed, etc.) and soiling measurements.

The calculations require the summation of energy produced from the PV system over the specified period of time. In the case of the 7-day forecast tool, the actual energy production may be used in the calculation; in the annual clean cycle forecast tool, an annual approximation of the energy production for the plant is calculated using a PV performance modeling tool (i.e. PV system, PVWATTS . . . etc).

The energy and associated losses due to soiling are calculated and summed over the soiling period until either 1) a rainfall event or 2) a manual clean event occur within the given soiling period. If the amount of rainfall in a single hour exceeds the user specified threshold (mm/hr) the panels are considered cleaned, the soiling rate is set to 0%, and a rainfall clean event is noted on the schedule. A rainfall event that is less than the specified amount results in a reduction in the accumulated soiling % by a ratio of the amount of rainfall (mm/hr)/rainfall clean amount (mm/hr).

The hourly accumulated soiling loss percentage is multiplied by the total energy produced per hour to calculate the sum the energy lost due to soiling until a "cleaning event" (rainfall or panel cleaning) within the given soiling period sets the summation back to 0 or a calculated ratio of the accumulated soiling % (in the case of a rain event less than the rainfall clean amount). Additional weather factors such as the wind speed and direction, relative humidity, type of foundation/soiling, panel angle of installation, rainfall, may also be considered when calculating the soiling rate on an hourly basis.

The cost of the loss of energy due to accumulated soiling is compared with the cost of cleaning at each hour throughout the first year to determine the optimal frequency and schedule for cleaning, over the first year.

In the case that the soiling level results in a total energy production loss and cost of energy loss, which is greater than the cost of cleaning the panels, within a given soiling period then a panel cleaning is scheduled for that day or days required to clean the PV system.

The amount of time required for the soiling to stabilize or reach the maximum soiling loss percentage or return to the previous level before a clean event, is the soiling loss period. It is the job of the PV clean cycle forecast tool and 7-day forecast tool, to determine if a future investment in cleaning will pay off within this soiling period.

Physically the soiling losses can be measured using an on-site PV soil monitoring system as described here previously and verify if the relevant predictions were correct and calculate how much was gained from the investment in cleaning. If the cost of the loss of energy due to soiling is greater than or equal to the cost of cleaning the PV system, within this soiling loss period, then the investment in cleaning pays off. If the cost of the loss of energy due to soiling is less than the cost of cleaning the PV system during the soiling period, Then the user lost money from the investment in cleaning the PV system.

The correct algorithm therefore, should account for the future soiling rate, by defining the soiling period and determining whether or not an investment into cleaning will pay off during this period. If the investment into cleaning the PV system is not predicted to pay off in a given soiling period, Then, the soiling period should be incremented by one-time unit (i.e. one hour) (i.e. the same soiling period, projected 1 hour later), until a clean event is triggered within the soiling period.

The output report provides users an annual calendar (365 days) where cleaning events are noted (natural events are in green, scheduled cleanings are in red) for each day of the year. Other information such as, total estimated cost of cleaning, total amount of energy lost due to soiling, total cost of energy lost due to soiling, average soiling loss percentage, and total number of cleanings are displayed in the resulting, clean cycle calendar.

PV system performance datasets and weather datasets may be saved so that the model can be re-run using different user inputs.

In another embodiment the PV clean cycle forecast tool may be configured so as to calculate a maximum soiling loss percentage for a given PV system. In this case the forecast tool will use the max soiling loss percent (instead of cost of the loss of energy) to determine when to clean the panels. When the accumulated soiling loss is greater than or equal than the mass soiling loss percent specified by the user, a manual clean is triggered and marked on the clean cycle calendar. The tool results will specify the cost of cleaning, cost of soiling loss, total energy lost and the estimated average soiling percent.

In yet another embodiment the PV clean cycle forecast tool can be configured, to calculate the soiling loss based-on a specified cleaning cycle. In this case the user selects the days to clean from an interactive calendar and the tool calculates the resulting soiling loss percentage for the year, cost of soiling loss, and cost of cleaning given the selected cleaning cycle.

There are two forecast tools presented here with slightly different algorithms. The PV clean cycle forecast tool is a near term predictive tool that utilizes actual soiling rates and near term weather forecasts to determine the soiling window (as described above).

PV Clean Cycle Calendar Predictive Software Detailed Descriptions

The PV clean cycle calendar is a near-term (i.e. 7-day) forecast which determines when will be the next optimal time to clean the PV panels.

In one embodiment, the near-term (i.e. 7-day) predictive software may calculate the optimal cleaning cycle. The required datasets and user inputs may include:
1. DC power produced per the time unit defined (i.e. hours) for all or a portion of the PV system
    i. The ACTUAL energy production datasets are used to verify the economics of the cleaning investment (i.e. did cleaning the PV system pay off during the last soiling period).
        1. This dataset may be derived from regular logs of a single PV string within a PV system or alternatively may be parsed from a third-party monitoring report, or directly uploaded from a third-party monitoring system.
    ii. The FORECASTED energy production datasets are used to predict when the cost of cleaning=the cost of loss of energy due to soiling for the Soiling Period
        1. This dataset may be derived from an energy modeling tool such as PVSYST or PVWATTS or alternatively may be derived from system design inputs and local weather forecasts.
2. Actual Soiling measurements from Soil Monitoring System
    i. This dataset is used to calculate regression coefficients to predict the near-term soiling rates and soiling window.
        1. The dataset may include time stamps to calculate the incident angle of the sun and its effects on soiling throughout the day.
3. Near-term (i.e. 7-day) local weather forecast
    i. This dataset may be obtained from a third-party API or alternatively may be gathered by onsite weather sensors for near term predictions of local weather.
4. The following inputs may be used to collect information used to calculate user specific data:
    i. Location of Plant (state, city, street, zip)
    ii. DC System Size (kWp)
    iii. AC Inverter Max Output Rating (kWp)
        1. This dataset is used to calculate inverter clipping
    iv. Module Type: (Poly, Mono, Thin film)
    v. Array Type: (Roof, Ground Fixed, Ground 1-Axis Tracking, Ground 2-Axis Tracking)
1. Panel Tilt (degrees): (0-90)
2. Azimuth (Degrees): (0-360): 0 degrees is North.
3. Advanced Parameters: (DC to AC Size Ratio, Inverter Efficiency)

PV Annual Clean Cycle Calendar Algorithms and Datasets
1. After constructing the weather and energy output data files (.csv), we use the weather adjusted Soiling Rate from the PV Soil Monitoring System (i.e. Characteristic soiling patterns correlated with locally forecasted weather) to determine the Soiling Period (the time it takes for the soiling to return to the previous soiling loss %). For the initial period the Soiling Period may be defined as the time it takes to reach the Maximum Soiling Loss %.
2. The Soiling Loss % is calculated by measuring the soiling loss from the Soil Monitoring system as described above. A regression model based-on the actual soiling measurements from the previous period may be used to calculate the soiling window (soiling rate defined from the time of clean panels to the moment of the max soiling loss) for the next period.
3. The Soiling Loss % is calculated for each time increment (i.e. hourly) into the future, by incrementing the defined Soiling Rate % which is added to the previous soiling loss % for the previous time instant (i.e. Previous hour).
4. The Amount of Energy Lost due to soiling for each time unit (i.e. each hour), is calculated by multiplying the DC Power Output (Watts)*the soiling loss % to get the Total Power (Watts) Lost per time period (i.e. hour).
5. After calculating the Total Power (Watts) Lost per hour, we use the user input Price of Energy*Total Energy Lost Due to Soiling, to get the Total Cost of Energy Lost per time period (i.e. hourly)
6. If the amount of precipitation in the weather forecast is >=the Rainfall Clean Amount (mm) calculated by the AI (machine learning from previous events), then the Soiling Loss % is reset to 0%, and the calendar is marked with a Rainfall Clean Event. If there is a Rainfall event which is <the Rainfall Clean Amount, then the Accumulated Soiling % is adjusted by the ratio of the Rainfall Amount (mm/hr)/Rainfall Clean Amount according to the previously characterized rainfall events in the soiling database.
7. Inverter Saturation—in the case where inverters are sized significantly less than peak power of the PV system, the inverter saturation is considered by eliminating any power lost to soiling that will result in a power production over the inverter rated DC capacity.
8. If the Total Cost of Energy Lost is <the Total Cost of Cleaning ($/kWp) AND the amount of precipitation is <the Rainfall Clean Amount, AND the total power production is under the inverter saturation limit, then we add the Total Cost of Energy Lost from the previous hour to the Total Cost of Energy Lost for the present hour.
9. The Total Cost of Energy Lost is summed over the forecasted Soiling Period until 1) the end of the Soiling Period has been reached OR 2) the Total Cost of Energy Lost is >=the Cost of Cleaning (user input).
    i. IFF the end of the Soiling Period has been reached we increment the time to the Soiling period by one-time unit (i.e. One hour) and repeat steps C, D, and E.
    ii. IFF the Total Cost of Energy Lost is >=the Cost of Cleaning (user input) within the defined Soiling Period, then we set the Soiling Loss % to 0 and mark the dataset with a Manual Cleaning Event.
10. Days to Clean—in the case of a Manual clean event (the Cost of Soiling Loss is >=Cost of Cleaning, we have to proportion the number of days it takes to clean the system (eg. If user inputs 10 days to clean the panels we clean ¹⁄₁₀ of the panels each day for 10 days). The remaining panels that are not cleaned will continue to loss energy at the summed rate, while those that were just cleaned the Total Soiling Loss % will be set back to monthly soiling rate.
11. The measured soiling rate and accumulated soiling losses are measured using on-site soil monitoring system (as described above). Cleaning Cycles, Soiling Losses and Soiling rates are measured and confirmed by the on-site soiling measurements.
12. The Manual Clean Events will be saved in an array and output on a yearly calendar
13. The Rain Clean Events will be saved in an array and output on a yearly calendar
14. The total cost of cleaning (for the next and/or previous period) will be summed and output
15. The total cost of soiling loss (for the next and or previous period) will be summed and output
16. The average soiling loss % (for the next and or previous period) will be summed and output. The user will have the option to re-run the calculation using different values for Cost of Cleaning, Cost of Energy, Average Monthly Soiling Loss % (per month), Days to Clean, and Rainfall Clean Amount (mm).

The output of the Clean Cycle Calendar may be presented in a monthly or weekly calendar and/or report that displays one or more of the following user outputs:
1. Cost of Cleaning
2. Cost of Soiling Loss
3. Manual Cleaning event (estimated day to clean using manual cleaning techniques)
4. Rainfall clean event (estimated clean by rainfall)
5. Sandstorm (estimated sand storm)
6. Muddy Rainfall event (estimated dirty rain which will dirty the panels)

Annual Clean Cycle Forecast Tool

The Annual Clean Cycle Forecast Tool is a predictive software tool that is used to estimate the soiling losses, frequency of cleaning and costs for a given PV system.

There may be three different configurations (algorithms) for running the Annual Clean Cycle Forecast tool. These include:
1. Calculate the Optimal Clean Cycle
2. Calculate the Clean Cycle based-on a specified Soiling Rate
3. Calculate the Soiling Rate based-on the Clean Cycle After selecting one of the options above the software may calculate two datasets (required for all three embodiments above):
1. The hourly first year energy output (DC Watts) 8760 .csv
    i. This dataset may be calculated using the NREL performance calculator (PV Watts) or similar PV performance modeling software.
2. The hourly first year TMY weather dataset .csv (or other data formats).
    i. This dataset will be calculated using an API where users can specify location data and retrieve an hourly weather dataset
3. First Year Soiling Rate
    i. This dataset may be calculated using actual soiling measurements which closely correspond to the PV system design, location, environmental and weather specific data.
    ii. The software may use a regression model to calculate future soiling rates based-on actual soiling rates and cross correlated weather data, system design and environmental conditions.

Using the required PV system information we first calculate the Hourly First Year Energy Output from a specified PV performance modelling application and fetch and save the resulting DC Energy Output
1. The following inputs page may be used to collect information used to calculate the Energy Output Dataset (PV Watts):
    i. Location of Plant (state, city, street, zip)
    ii. DC System Size (kWp)
    iii. Module Type: (Poly, Mono, Thin film)
    iv. Array Type: (Roof, Ground Fixed, Ground 1-Axis Tracking, Ground 2-Axis Tracking)
    v. System loss % (see Loss Calculator PV Watts)
    vi. Panel Tilt (degrees): (0-90)
    vii. Azimuth (Degrees): (0-360): 0 degrees is North.
    viii. Advanced Parameters: (DC to AC Size Ratio, Inverter Efficiency)
2. Next calculate the Hourly First Year Weather Data (precipitation, wind speed, RH) from the weather API and save the (ie. hourly .csv) file.
    i. For the Weather Dataset only the location (lat/long) will be required.
3. Using the weather dataset and PV system design and location inputs, a soiling rate dataset is calculated for the first year of operation.
    i. A soiling rate calculator may be provided to help users determine the soiling rate based-on the specific design and location of the pv system (see Soiling Rate Calculator section below).

In one embodiment, the Annual PV Clean Cycle Predictive Software may Calculate Optimal Cleaning Cycle, (User may also choose to Upload a PVSYST .csv file or similar file).

The following user inputs may be required:
1. Average Monthly Soiling Rate % (see Soiling Rate Calculator)
2. Module Frame Type: (Framed, Frameless)
3. Rainfall Clean amount (mm)
4. Max Cumulative Soiling Loss %
5. Sandstorm Events calendar
6. Muddy Rain Event Periods
7. Currency (Euro/$)
8. Average Cost of Cleaning ($/kWp/yr)
9. Average Cost of Energy ($/kWh)
10. Cleaning Duration (number of days required to clean the entire plant) (1-30 days)
11. Cleaning Cycle Start Date (day to begin cleaning cycle)

After constructing the weather and energy output data files (.csv), we use the weather adjusted Soiling Rate from the PV Soil Monitoring System (i.e. characteristic soiling patterns correlated with locally forecasted weather) to determine the Soiling Period (the time it takes for the soiling to return to the previous soiling loss %). For the initial period the Soiling Period may be defined as the time it takes to reach the Maximum Soiling Loss %.

The Soiling Loss % for each time increment (i.e. hourly) is incremented by the defined Soiling Rate % which is added to the previous soiling loss % for the previous time instant (i.e. Previous hour).

The Amount of Energy Lost due to soiling for each time unit (i.e. Each hour), is calculated by multiplying the DC Power Output (Watts)*the soiling loss % to get the Total Power (Watts) Lost per time period (i.e. hour).

After calculating the Total Power (Watts) Lost per hour, we use the user input Price of Energy*Total Energy Lost Due to Soiling, to get the Total Cost of Energy Lost per time period (i.e. hourly)

If the amount of precipitation in the weather forecast is >=the Rainfall Clean Amount (mm) calculated by the AI (machine learning from previous events), then the Soiling Loss % is reset to 0%, and the calendar is marked with a Rainfall Clean Event. If there is a Rainfall event which is <the Rainfall Clean Amount, then the Accumulated Soiling % is adjusted by the ratio of the Rainfall Amount (mm/hr)/Rainfall Clean Amount according to the previously characterized rainfall events in the soiling database.

Inverter Saturation—in the case where inverters are sized significantly less than peak power of the PV system, the inverter saturation is considered by eliminating any power lost to soiling that will result in a power production over the inverter rated DC capacity. If the Total Cost of Energy Lost is <the Total Cost of Cleaning ($/kWp) AND the amount of precipitation is <the Rainfall Clean Amount, AND the total power production is under the inverter saturation limit, then we add the Total Cost of Energy Lost from the previous hour to the Total Cost of Energy Lost for the present hour.

The Total Cost of Energy Lost is summed over the Soiling Period until 1) the end of the Soiling Period has been reached OR 2) the Total Cost of Energy Lost is >=the Cost of Cleaning (user input).
1. IFF the end of the Soiling Period has been reached we increment the beginning of the Soiling period (i.e. The time when the Soiling Period starts) by one-time unit (i.e. one hour) and repeat steps C, D, and E.
2. IFF the Total Cost of Energy Lost is >=the Cost of Cleaning (user input) within the defined Soiling Period, then we set the Soiling Loss % to 0 and mark the dataset with a Manual Cleaning Event.

Days to Clean—in the case of a Manual clean event (the Cost of Soiling Loss is >=Cost of Cleaning, we have to proportion the number of days it takes to clean the system (eg. If user inputs 10 days to clean the panels we clean ¹/₁₀ of the panels each day for 10 days). The remaining panels that are not cleaned will continue to loss energy at the summed rate, while those that were just cleaned the Total Soiling Loss % will be set back to monthly soiling rate.

The Manual Clean Events will be saved in an array and output on a yearly calendar The Rain Clean Events will be saved in an array and output on a yearly calendar The total cost of cleaning (first year) may be summed and outpu.

The total cost of soiling loss (first year) may be summed and output.

The average soiling loss % (first year) may be summed and output.

The user may have the option to re-run the calculation using different values for Cost of Cleaning, Cost of Energy, Average Monthly Soiling Loss % (per month), Days to Clean, and Rainfall Clean Amount (mm).

In another embodiment the Annual PV Clean Cycle Predictive software may Calculate the Cleaning Cycle required to maintain a Maximum soiling loss %.

The following user inputs may include:
1. Average Soiling Rate % per month (see Soiling Rate Calculator)
2. Module Frame Type: (Framed, Frameless)
3. Rainfall Clean amount (mm)
4. Max Cumulative Soiling Loss %
5. Sand Storm Events Calendar
6. Muddy Rainfall Event Periods
7. Currency (Euro/$)
8. Average Cost of Cleaning ($/kWp/yr)
9. Average Cost of Energy ($/kWh)
10. Cleaning Duration (number of days required to clean the entire plant)
11. Cleaning Cycle Start Date (day to begin cleaning cycle)

After constructing the weather and energy output data file we use the user input Monthly Soiling Rate accumulated over the specified time period to determine the Amount of Energy Lost, by multiplying the Energy Output (Watts)*the hourly soiling loss % (derived from the monthly average Soiling Loss %) to get the Total Watts Lost (per hour).

After calculating the Total Watts Lost per hour, we use the user input Cost of Energy*Total Watts Lost to get the Total Cost of Energy Lost per hour.

If the Max Allowable Soiling Loss % (use input)>=Soiling Loss % (this is calculated as the hourly cumulative soiling loss percent) we set the Soiling Loss % to 0 and mark the dataset with a Manual Cleaning Event. OR if the amount of precipitation in the weather dataset is >=the Rainfall Clean Amount (mm) input by the user, then the Soiling Loss % is set back to 0 and we mark the dataset with a Rainfall Cleaning Event. If there is a Rainfall event which is <the Rainfall Clean Amount, then the Accumulated Soiling % is adjusted by a ratio of a Rainfall Amount (mm/hr)/Rainfall Clean Amount.

If there is a Rainfall event which is <the Rainfall Clean Amount, then the Accumulated Soiling % is adjusted by the ratio of the Rainfall Amount (mm/hr)/Rainfall Clean Amount.

The Amount of Energy Lost Due to Soiling is determined by multiplying the Accumulated Soiling % by the Total Power Produced by the PV system for each hour of the performance output (8760, .csv).

Inverter Saturation—in the case where inverters are sized significantly less than peak power of the PV system, the inverter saturation is considered by eliminating any power lost to soiling that will result in a power production over the inverter rated DC capacity.

If the Total Cost of Energy Lost is <the Total Cost of Cleaning ($/kWp) AND the amount of precipitation is <the Rainfall Clean Amount, then we add the Total Cost of Energy Lost from the previous hour to the Total Cost of Energy Lost for the present hour.

Days to Clean—in the case of a Manual clean event (the Cost of Soiling Loss is >=Cost of Cleaning, we have to proportion the number of days it takes to clean the system (e.g. If user inputs 10 days to clean the panels we clean ¹⁄₁₀ of the panels each day for 10 days). The remaining panels that are not cleaned will continue to loss energy at the summed rate, while those that were just cleaned the Total Soiling Loss % will be set back to monthly soiling rate.

The Manual Clean Events will be saved in an array and output on a yearly calendar.

The Rain Clean Events will be saved in an array and output on a yearly calendar.

The total cost of cleaning (first year) will be summed and output.

The total cost of soiling loss (first year) may be summed and output.

The average soiling loss % (first year) may be summed and output.

The user may have the option to re-run the calculation using different values for Cost of Cleaning, Cost of Energy, Average Monthly Soiling Loss % (per month), Days to Clean, and Rainfall Clean Amount (mm).

In another embodiment the Annual PV Clean Cycle Predictive software may Calculate the Cleaning Cycle based-on a specific cleaning schedule.

The following user inputs may include:
1. Cleaning Cycle (the dates to clean should be selectable from a calendar graphic)
2. Average Soiling Rate % per month (see Soiling Rate Calculator)
3. Module Frame Type: (Framed, Frameless)
4. Rainfall Clean amount (mm)
5. Max Cumulative Soiling Loss %
6. Sand Storm Event Calendar
7. Muddy Rainfall Event Periods
8. Currency (Euro/$)
9. Average Cost of Cleaning ($/kWp/yr)
10. Average Cost of Energy ($/kWh)
11. Cleaning Duration (number of days required to clean the entire plant)

After constructing the weather and energy output data file (.csv), the user inputs Monthly Soiling Rate accumulated over the time period to determine the Amount of Energy Lost each hour, by multiplying the Energy Output (Watts) *the hourly soiling loss % (derived from the monthly average Soiling Loss %) to get the Total Watts Lost (per hour).

After calculating the Total Watts Lost per hour, the user input Cost of Energy*Total Watts Lost is used to get the Total Cost of Energy Lost per hour.

If the Day of Cleaning is marked on the Calendar (user input) the Soiling Loss percentage is set to 0 and mark the dataset with a Manual Cleaning Event or if the amount of precipitation in the weather dataset is >=the Rainfall Clean Amount (mm) input by the user, then the Soiling Loss % is set back to 0 and the dataset is marked with a Rainfall Cleaning Event. If there is a Rainfall event which is <the Rainfall Clean Amount, then the Accumulated Soiling % is adjusted by the ratio of the Rainfall Amount (mm/hr)/Rainfall Clean Amount.

If there is a Rainfall event which is <the Rainfall Clean Amount, then the Accumulated Soiling % is adjusted by the ratio of the Rainfall Amount (mm/hr)/Rainfall Clean Amount.

The Amount of Energy Lost Due to Soiling is determined by multiplying the Accumulated Soiling % by the Total Power Produced by the PV system for each hour of the performance output (8760, .csv).

Inverter Saturation—in the case where inverters are sized significantly less than peak power of the pv system, the inverter saturation is considered by eliminating any power lost to soiling that will result in a power production over the inverter rated DC capacity.

If the Total Cost of Energy Lost is <the Total Cost of Cleaning ($/kWp) AND the amount of precipitation is <the Rainfall Clean Amount, then the Total Cost of Energy Lost from the previous hour is added to the Total Cost of Energy Lost for the present hour.

Days to Clean—in the case of a Manual clean event (the Cost of Soiling Loss is >=Cost of Cleaning, the number of days it takes to clean the system must be proportioned (e.g. if user inputs 10 days to clean the panels we clean ¹⁄₁₀ of the panels each day for 10 days). The remaining panels that are not cleaned will continue to loss energy at the summed rate, while those that were just cleaned the Total Soiling Loss % will be set back to the monthly soiling rate.

The Manual Clean Events will be saved in an array and output on a yearly calendar.

The Rain Clean Events will be saved in an array and output on a yearly calendar. The total cost of cleaning (first year) may be summed and output.

The total cost of soiling loss (first year) may be summed and output.

The average soiling loss % (first year) may be summed and output.

The user will have the option to re-run the calculation using different values for Cost of Cleaning, Cost of Energy, Average Monthly Soiling Loss % (per month), Days to Clean, and Rainfall Clean Amount (mm).

Soiling Rate Calculator

In one embodiment the PV Clean Cycle predictive software may include a Soiling Rate Calculator. The Soiling Rate Calculator part of the PV Clean Cycle Forecast tool and is intended to help users estimate the rate of soiling accumulation for the PV system. Soiling rates are highly dependent on technology, design and location, and therefore will vary widely for each PV system. The Soiling Rate Calculator is an optional calculator that is integrated into the Web-Based, PV Clean Cycle Forecast Tool.

In one embodiment of the Soiling Rate Calculator, the user may be presented with some additional inputs, including but not limited to:
1. Type of Panel Frame (Framed/Frameless)
2. Type of foundation (Grass, gravel, dirt, sand, TPO/PVC, ModBit, Water)
3. Environmental Factors (Surrounding Trees/Pollen, Nearby Factories/Smog, Nearby Highway, Nearby Ocean, Neaby Farm, Desert)

Previously inputted data from the PV Clean Cycle Forecast Tool form, may also be used in the calculation of the Soiling Rate including:
1. Location of the PV System
2. Tilt Angle of the PV panels 3. Array Type (fixed (open rack), Fixed (roof mount), SAT, SAT (Backtracking), 2-Axis tracking)
4. Module Type (Polycrystaline, Monocrystaline, Thin Film)

Additionally, a Soiling Rate database derived from the data collected from customer sites, may be used to match corresponding design, technology, and location data in order to calculate the most appropriate Soiling Rates for each period.

After clicking the Calculate button, the Monthly Average Soiling Rates for each month of the year are populated, in the PV Clean Cycle Forecast Tool. Users may choose to further modify any of the values.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A solar panel cleaning system comprising:
   an automated cleaning device for cleaning a surface of a reference cell panel;
   a cleaning device controller in communication with a motor of the automated cleaning device, the cleaning device controller configured to receive a signal corresponding to measurement of a current of photovoltaic system;
   a reference cell cover that is movable between open and closed positions, wherein in a closed position the reference cell cover substantially protects the surface of the reference cell panel;
   an electronics enclosure housing a motor controller and a motor for moving the reference cell cover between open and closed positions;
   wherein the cleaning device controller activates the automated cleaning device to clean a surface of the reference cell panel when the received signal indicates that a measurement of the current of the photovoltaic system is to be taken.

2. The solar panel cleaning system of claim 1, the reference cell cover further comprising a brush attached to the reference cell cover for cleaning the surface of the reference cell panel when the reference cell cover moves between open and closed positions.

3. The solar panel cleaning system of claim 2, further comprising a moisture sensor located adjacent the reference cell panel.

4. The solar panel cleaning system of claim 1, wherein the reference cell cover is slidably associated with the reference cell panel such that the reference cell cover slides between open and closed positions to protect the surface of the reference cell panel.

5. The solar panel cleaning system of claim 4, further comprising a linear motor in communication with the reference cell cover for sliding the reference cell cover between open and closed positions.

6. The solar panel cleaning system of claim 5, the linear motor comprising a drive screw engaged with a drive screw bar that is attached to the reference cell cover to move the reference cell cover between open and closed positions.

7. The solar panel cleaning system of claim 1, wherein reference cell panel is connected to a printed circuit board.

8. The solar panel cleaning system of claim 1, further comprising a data acquisition system (DAS) for sending instructions to the automated cleaning device to measure the short circuit current of the reference cell panel and receiving data corresponding to the photovoltaic system.

9. The solar panel cleaning system of claim 8, wherein the data acquisition system determines an amount of soiling loss based on measured short circuit currents of panels of the photovoltaic system and the reference cell panel.

10. The solar panel cleaning system of claim 1, wherein the reference cell panel shares a glass substrate with a soil monitoring panel of the photovoltaic system.

11. The solar panel cleaning system of claim 1, further comprising one or more gaskets between the reference cell cover and the reference cell panel.

12. The solar panel cleaning system of claim 1, wherein the reference cell panel and soil monitoring panels are installed co-planar to the photovoltaic system.

13. A solar panel cleaning system comprising:
    an automated cleaning device for cleaning a surface of a reference cell panel;
    a cleaning device controller in communication with a motor of the automated cleaning device, the cleaning device controller configured to receive a signal corresponding to measurement of a current of photovoltaic system;
    a reference cell cover that is movable between open and closed positions, wherein in a closed position the reference cell cover substantially protects the surface of the reference cell panel;
    wherein the cleaning device controller activates the automated cleaning device to clean a surface of the reference cell panel when the received signal indicates that a measurement of the current of the photovoltaic system is to be taken.

* * * * *